(12) United States Patent
Okada et al.

(10) Patent No.: US 8,367,033 B2
(45) Date of Patent: Feb. 5, 2013

(54) FULLERENE-BASED MATERIAL AND PROCESS FOR PRODUCING FULLERENE-BASED MATERIAL

(75) Inventors: Hiroshi Okada, Miyagi (JP); Yoshinori Sibata, Miyagi (JP); Kuniyoshi Yokoo, Miyagi (JP); Yuzo Mizobuchi, Miyagi (JP); Kenji Omote, Miyagi (JP); Yasuhiko Kasama, Miyagi (JP)

(73) Assignee: Hiroyuki Kaneko, Fukuoka (JP)

( * ) Notice: Subject to any disclaimer, the term of this patent is extended or adjusted under 35 U.S.C. 154(b) by 810 days.

(21) Appl. No.: 12/297,728

(22) PCT Filed: Apr. 20, 2007

(86) PCT No.: PCT/JP2007/058644
§ 371 (c)(1),
(2), (4) Date: Nov. 20, 2008

(87) PCT Pub. No.: WO2007/123208
PCT Pub. Date: Nov. 1, 2007

(65) Prior Publication Data
US 2009/0105386 A1    Apr. 23, 2009

(30) Foreign Application Priority Data
Apr. 20, 2006    (JP) .................. 2006-116820

(51) Int. Cl.
*C01B 31/02* (2006.01)
(52) U.S. Cl. .................. 423/445 B; 977/734; 977/736
(58) Field of Classification Search .............. 423/445 B; 977/734–741, 842–848
See application file for complete search history.

(56) References Cited

U.S. PATENT DOCUMENTS

| 6,303,016 B1 | 10/2001 | Diener et al. |
| 2007/0145352 A1 * | 6/2007 | Kasama et al. .................. 257/40 |

FOREIGN PATENT DOCUMENTS

| JP | 5-213610 | 8/1993 |
| JP | 5-282938 | 10/1993 |
| JP | 5-327038 | 12/1993 |
| JP | 6-127910 | 5/1994 |
| JP | 9-249406 | 9/1997 |
| JP | 2001-199715 | 7/2001 |
| JP | 2005-504700 | 2/2005 |
| JP | 2005-320219 | 11/2005 |
| JP | 2006-36569 | 2/2006 |
| JP | 2006-73201 | 3/2006 |
| WO | WO 2004/094309 | 11/2004 |
| WO | WO 2005/049538 | * 2/2005 |

OTHER PUBLICATIONS

Jan Jehlicka et al., Low Extraction Recovery of Fullerene From Carbonaceous Geoligical Materials Spiked With $C_{60}$, Carbon, 2005, vol. 43, pp. 1909-1917.

* cited by examiner

*Primary Examiner* — Daniel C McCracken
(74) *Attorney, Agent, or Firm* — Young & Thompson

(57) ABSTRACT

In order to isolate and purify an endohedral fullerene, a solvent washing was performed using toluene to concentrate the endohedral fullerene in a residual, but endohedral fullerene could not be efficiently purified because impurities other than the endohedral fullerene could not be sufficiently removed. Thus, the endohedral fullerene is isolated and purified by using a solvent such as chloronaphthalene or tetralin having a high solubility for the endohedral fullerene and concentrating the endohedral fullerene in the solvent. The endohedral fullerene isolated and purified by solvent extraction has a cluster structure where the endohedral fullerene is surrounded with empty fullerenes. Thus, this endohedral fullerene is highly stable and is a useful material applicable to various fields such as medical care and electronics.

5 Claims, 22 Drawing Sheets

FIG. 2

| Solvent type | Solvent | Extraction solution Color | Extraction solution MS 727 | Extraction solution MS 720 | Residual MS 727 | Residual MS 720 | Total evaluation |
|---|---|---|---|---|---|---|---|
| Benzene-based | Toluene | violet | × | ◎ | ◎ | △ | suitable for solvent washing |
| | Ethyl Benzene | violet | × | ◎ | ◎ | ○ | suitable for solvent washing |
| | Mesitylene | violet | × | ○ | ◎ | △ | suitable for solvent washing |
| | Tetralin | dark brown | ◎ | ◎ | ◎ | △~× | suitable for solvent extraction |
| Chloro-based | ODCB | dark brown | ◎~○ | ◎ | ◎ | △ | suitable for solvent extraction |
| | Cl-naph | dark brown | ○ | ◎ | ◎ | △ | suitable for solvent extraction |

FIG. 6
(a)
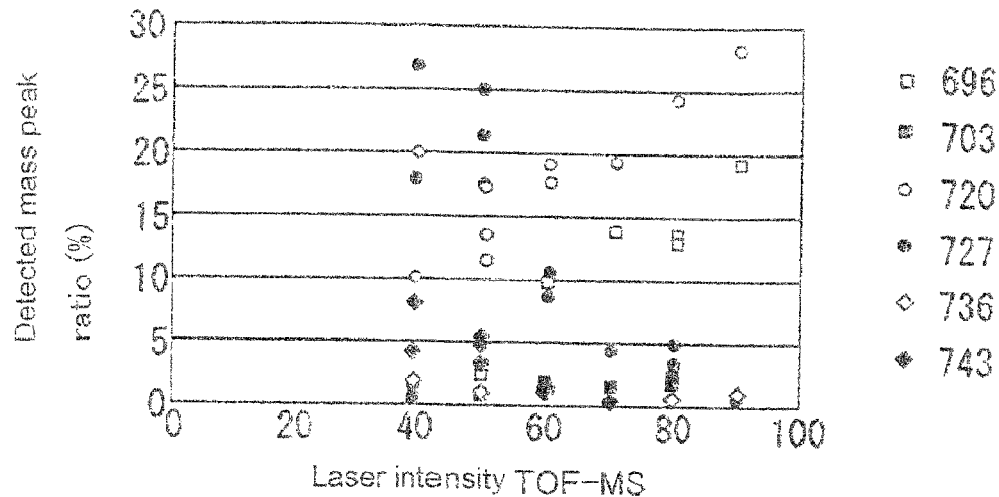
(b)
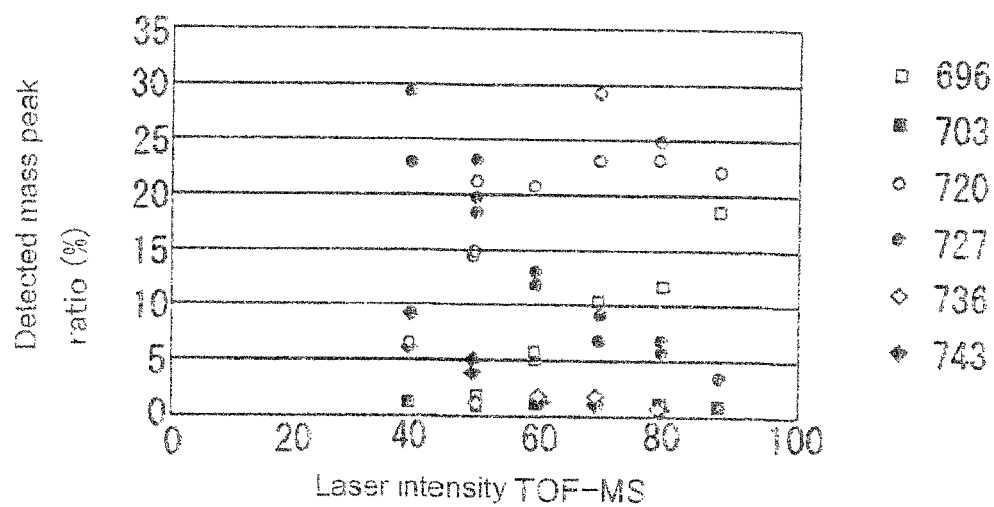

FIG. 8
(a)
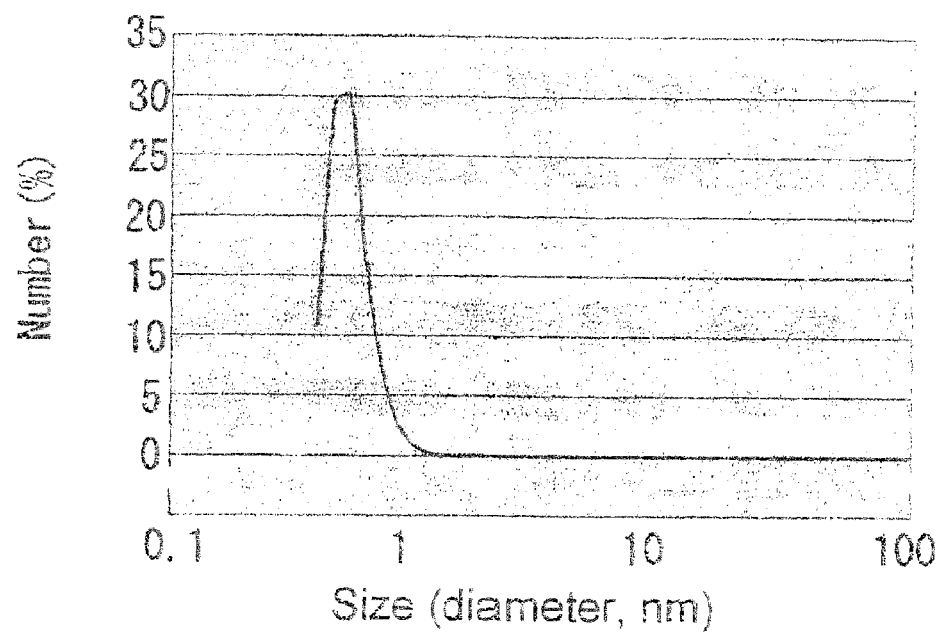
(b)
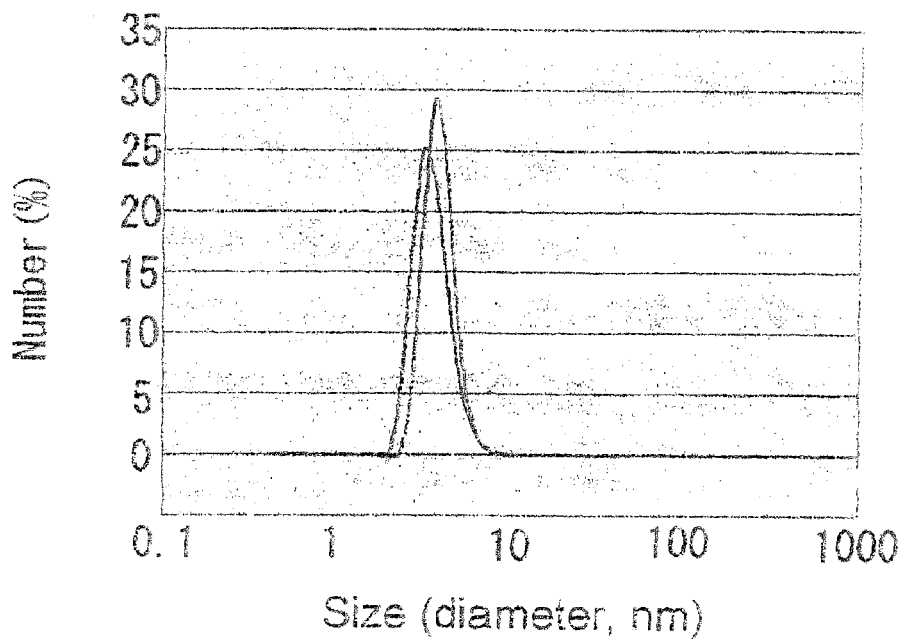

FIG. 16
(a)
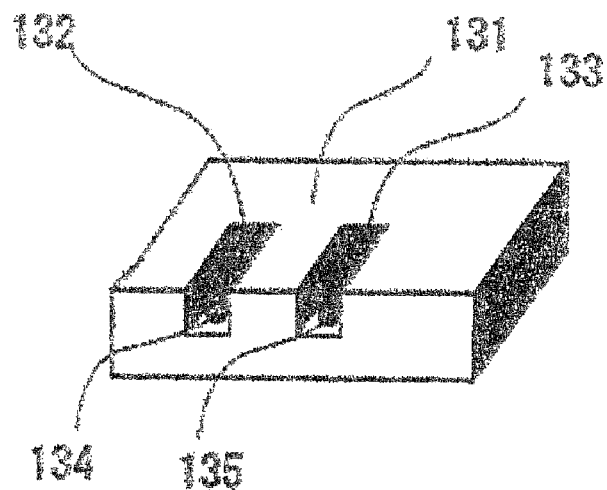
(b)
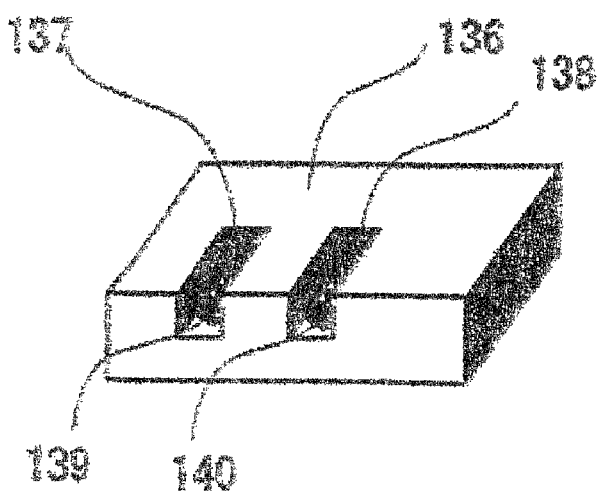

FIG. 20

| Sample number | Synthesized product weight (g) | Extracted product weight (g) | Elemental analysis of extracted product | | | | Ratio of endohedral fullerene (%) | Ratio of extraction (%) | Recovery rate of Li@C60 (%) |
|---|---|---|---|---|---|---|---|---|---|
| | | | Li wt% | O wt% | H wt% | O wt% | | | |
| 01 | 6.0 | 0.3955 | 0.072 | 94.5 | 0.4 | 4.2 | 7.2 | 6.6 | 0.47 |
| 02 | 3.0 | 0.1497 | 0.004 | - | - | - | 0.4 | 5.0 | 0.02 |
| 03 | 1.4992 | 0.0737 | 0.066 | 95.0 | 0.5 | 3.5 | 6.6 | 4.9 | 0.32 |
| 04 | 1.3159 | 0.0653 | 0.074 | - | - | - | 7.4 | 5.0 | 0.37 |
| 05 | 1.5017 | 0.0272 | 0.063 | 95.7 | 0.5 | 2.9 | 6.3 | 1.8 | 0.11 |
| 06 | 1.5010 | 0.0946 | 0.064 | 94.0 | 0.7 | 4.4 | 6.4 | 6.3 | 0.40 |
| 07 | 1.5008 | 0.1069 | 0.050 | 96.5 | 0.5 | 2.6 | 5.0 | 7.1 | 0.36 |
| 08 | 1.5005 | 0.1078 | 0.032 | 95.9 | 0.6 | 3.5 | 3.2 | 7.2 | 0.23 |
| avg | | | 0.0606 | 95.2167 | 0.53 | 3.52 | 6.06 | 5.49 | 0.323 |
| stdev | | | 0.0136 | 0.90 | 0.10 | 0.70 | 1.36 | 1.77 | 0.110 |
| max | | | 0.074 | 96.5 | 0.7 | 4.4 | 7.4 | 7.2 | 0.47 |
| min | | | 0.032 | 94.0 | 0.4 | 2.6 | 3.2 | 1.8 | 0.11 |

Ratio (%) of endohedral fullerene = Li wt% × 727 / 7

Ratio (%) of extraction = Extracted product weight (g) / Synthesized product weight (g) × 100

Li@C60 recovery rate = Ratio of endohedral fullerene × Ratio of extraction / 100

FULLERENE-BASED MATERIAL AND PROCESS FOR PRODUCING FULLERENE-BASED MATERIAL

TECHNICAL FIELD

The present invention relates to a method for isolating and purifying an endohedral fullerene, and an endohedral fullerene cluster and practical application thereof.

BACKGROUND ART

Patent Document 1: JP Hei-05-282938-A
Nonpatent Literature 1: Hisanori Shinohara and Yahachi Saito, "Chemistry and Physics of Fullerene", The University of Nagoya Press.
Nonpatent Literature 2: A. Gromov et al., J. Phys. Chem. B, 107, 11290-11301, 2003.
Nonpatent Literature 3: J. Am. Chem. Soc., 116, 6005-6006, 1994.

An endohedral fullerene is a carbon cluster encapsulating atoms such as Li inside the fullerene and is a material anticipated to be practically applied to electronics and medical cares.

To synthesize the endohedral fullerene, methods of laser evaporation, arc discharge, ion injection, and plasma irradiation have been used. Besides the endohedral fullerene, many impurities such as empty fullerenes and the atoms, which were not encapsulated inside, are included in a product synthesized by these methods. Thus, in order to produce the endohedral fullerenes with high purity, it is necessary to separate the endohedral fullerene from these impurities and purify the endohedral fullerene.

DISCLOSURE OF INVENTION

Problem to be Solved by the Invention

Liquid chromatography and solvent extraction have been reported as the methods for separating and purifying the endohedral fullerene (Nonpatent Literature 1). For example, it has been reported that the endohedral fullerene, which encapsulates a metal of IIIA GROUP such as La, Y or Sc inside a higher fullerene such as C82 or C84, can be extracted with toluene or carbon disulfide. However, the empty fullerene is also highly soluble in non-polar solvents such as toluene and carbon disulfide. Thus, the endohedral fullerene with high purity cannot be separated and purified in the solvent extraction using these solvents.

The synthesis process of the endohedral fullerene featuring the structure in which a higher fullerene encapsulates a metal of the IIIA GROUP by the arc discharge method and the method of extraction with an organic solvent were reported (Patent Document 1). As the organic solvent, aromatic hydrocarbon such as benzene and toluene, and halogenated aromatic hydrocarbon such as chlorobenzene and chloronaphthalene are used. However, in the solvent extraction reported in Patent Document 1, the empty fullerene is simultaneously dissolved in the solvent, and thus this is not the method for separating the endohedral fullerene from the empty fullerene and purifying the endohedral fullerene.

In the meantime, it has been said that extracting the endohedral fullerenes whose $C_{60}$ or $C_{70}$ encapsulates the metal inside by using solvent is very difficult. Kubozono et al has reported that $Ca@C_{60}$ and $Ca@C_{70}$ are extracted with pyridine at room temperature under an oxygen removal condition (Nonpatent Literature 1). As of 1997 when Nonpatent Literature 1 was published, the solvent extraction of an endohedral metallofullerene $M@C_{60}$ other than $Ca@C_{60}$ was not generally reported. Shinohara pointed out that this is because $M@C_{60}$ is unstable in the atmosphere or $M@C_{60}$ does not dissolve in many solvents.

In 2003, Campbell's group reported the solvent extraction of $Li@C_{60}$ (Nonpatent Literature 2). They generated $Li@C_{60}$ by injecting Li ion into an empty fullerene film at a low energy of 30 eV, and reported that the ion-injected film was dissolved in $CS_2$, and as a result $Li@C_{60}$ and $C_{60}$ were separated by high-performance liquid chromatography (HPLC). They further reported that the endohedral fullerene content of solvent in percentage is evaluated by mass spectrometry and the endohedral fullerene with a purity of 80% was successfully extracted using solvent. However, in their report of the successful extraction, they observed only a peak in a spectrum of laser desorbed time of flight mass spectrometry (LD-TOF-MS), and they did not successfully separate the endohedral fullerene in a measurable amount (several mg to several g). An intensity of a mass peak measured by LD-TOF-MS corresponds to an ionic strength in an extremely small area of a sample, and a local ionic strength does not necessarily correspond to a ratio of the endohedral fullerene in the whole sample. An ionization efficiency and an ion polarity upon measurement by LD-TOF-MS change depending on the physical property of the detection target substance. Therefore, a quantitative property such as the ratio of the endohedral fullerene cannot be obtained with high reliability from the result of LD-TOF-MS. Furthermore, an amount per time purified by HPLC is so small that the endohedral fullerene purification through HPLC is not preferable for industrial use since the production efficiency is low.

Contrary to the method in Nonpatent Literature 2, the present inventors attempted the method of solvent washing. This method, which is based on the characteristics that toluene hardly dissolves the Li endohedral fullerene and easily dissolves the empty fullerene, allows the product including the endohedral fullerene to be dissolved in toluene and thus increases the purity of the endohedral fullerene in an insoluble residual. FIG. 23 is a process flowchart of the method for separating and purifying the endohedral fullerene attempted by the present inventors. The unpurified endohedral fullerene 201 obtained by synthesis is treated with water to remove unreacted atoms to be encapsulated inside (step 202), and then is mixed with the solvent such as toluene (step 203). Since the empty fullerene, which is the impurity, is dissolved in toluene, the endohedral fullerene is concentrated in the residual, which is insoluble in the solvent that produces a purified product (204).

However, all empty fullerenes are not dissolved in the toluene through the method of the separation and purification in conventional solvent washing shown in FIG. 23. In particular, dimers and trimers including the empty fullerene are hardly to be dissolved in toluene. Thus, it is difficult to completely remove the empty fullerene from the residual. Also when the endohedral fullerene is purified by HPLC, it is necessary to dissolve the endohedral fullerene in the solvent. Furthermore when the endohedral fullerene is doped to a polymer film to produce an electronic device, it is more highly convenient to prepare the material obtained by dissolving the endohedral fullerene in the solvent compared with the case of preparing as powders having no good solvent.

Accordingly, it has been hoped to establish the method for evaluating the ratio of endohedral fullerenes with high reliability and establish the method for separating and purifying the endohedral fullerene in a macroscopic amount as the material soluble in the solvent, for research or industrial application of the endohedral fullerene.

Means for Solving Problem

The present invention (1) is a method for producing a fullerene-based material, which separates and purifies endohedral fullerenes by performing at least three treatments, namely, a first treatment to remove atoms that are not encapsulated and atomic compounds to be encapsulated inside the fullerene with an aqueous solvent from a synthesized endohedral fullerene product, a second treatment to extract the endohedral fullerene in a solvent, and a third treatment to remove empty fullerenes by reprecipitation.

The present invention (2) is a method for producing the fullerene-based material of the above invention (1), wherein a fourth treatment to remove impurities by solvent washing is performed between the first treatment and the second treatment.

The present invention (3) is a method for producing the fullerene-based material of the above invention (1) or (2) wherein the endohedral fullerene is an endohedral alkali metal fullerene.

The present invention (4) is a method for producing the fullerene-based material of the above inventions (1) to (3), wherein the solvent used in the second treatment is a solvent selected from tetralin, ortho-dichlorobenzene or chloronaphthalene.

The present invention (5) is a method for producing the fullerene-based material of the above inventions (1) to (4), wherein the solvent used in the third treatment is a solvent selected from toluene, a mixed solution of toluene and hexane, xylene, anisole, ethyl benzene, trimethyl benzene, mesitylene or cyclohexane.

The present invention (6) is a method for producing the fullerene-based material of the above inventions (2) to (5), wherein the solvent used in the fourth treatment is the solvent selected from toluene, the mixed solution of toluene and hexane, xylene, anisole, ethyl benzene, trimethyl benzene, mesitylene or cyclohexane.

The present invention (7) is a method for producing the fullerene-based material of the above inventions (1) to (6), wherein the synthesized endohedral fullerene product is synthesized by a plasma irradiation method.

The present invention (8) is a fullerene-based material wherein 12 to 55 fullerene molecules having no endohedral atom are bound to one endohedral alkali metal fullerene encapsulating an alkali metal atom therein.

The present invention (9) is the fullerene-based material of the above invention (8), wherein the alkali metal atom is Li, Na, K, Rb, Cs or Dr and the fullerene molecule is represented by a chemical formula $C_n$ (n=60 to 82).

The present invention (10) is a modified fullerene wherein a chemically modifying group is added to the fullerene-based material of the above invention (8) or (9).

The present invention (11) is a fullerene thin film composed of the fullerene-based material of the above invention (8) or (9).

The present invention (12) is a fullerene-dispersed polymer film wherein the fullerene-based material of the above invention (8) or (9) is dispersed in a polymer film.

The present invention (13) is a fullerene microstructure wherein the fullerene-based material of the above invention (8) or (9) is arranged on a substrate on which a groove having a width of 0.5 nm to 100 nm has been formed.

Effect of the Invention (1) By separating and purifying the endohedral fullerene by a composite process composed at least of a step of removing the unreacted potential endohedral atoms, a step of extracting the endohedral fullerene with the solvent, and a step of removing the empty fullerene by a reprecipitation technique, it is possible to highly purify the endohedral fullerene difficult to be isolated and purified only by the solvent extraction. Therefore, the amount of the endohedral fullerene that can be collected through the refinement thereof from the synthesized product can be increased, and the improvement of yield can also be improved.

(2) Since the purified endohedral fullerene is soluble in the solvent, it is highly convenient for producing the electronic devices and utilizing industrially. It is also possible to more highly purify by liquid chromatography such as HPLC.

(3) In the method for isolation and purification of the present invention, the fullerenes are isolated and purified by taking advantage of difference in solubility. Thus, the purified amount per time is larger and the production efficiency is higher than those in the isolation and purification by the liquid chromatography.

(4) The endohedral fullerene synthesized by the plasma irradiation and isolated and purified by the solvent extraction forms a cluster molecule where multiple empty fullerenes are attached around the endohedral fullerene. Unlike the endohedral fullerenes conventionally reported, this cluster structure is present stably in atmosphere, has the high solubility in the solvent, and has a great deal of potential in industry.

(5) A plurality of modifying groups can be added to the fullerene modification body using the fullerene-based material of the present invention. For example, when the modified fullerene is effectively used for a drug delivery system, it is possible to add the modifying groups having different multiple functions.

(6) In the fullerene thin film using the fullerene-based material of the present invention, a constant number of the empty fullerenes is evenly distributed between the endohedral fullerenes. For this reason, since an interval between the endohedral fullerenes can be reduced to several nanometers, when the fullerene thin film is practically applied to an optical memory using near-field light, a record density is increased.

(7) It is possible to use the fullerene thin film using the fullerene-based material of the present invention as a functional thin film in elements in solar batteries, transistors, organic EL elements, light emitting diodes, optical sensors, molecular sensors and ion sensors. Since electronic energy levels of the thin film can be controlled by selecting the endohedral atom and controlling the number of the empty fullerenes, it is possible to improve an element property.

(8) Since the endohedral fullerene-dispersed polymer film using the fullerene-based material of the present invention has a high dielectric constant of 30 to 60 and a high crystallinity, it is effective for improving the property of piezoelectric sensors. Furthermore, the endohedral fullerene-dispersed polymer film can be practically applied to small capacitors with large capacity by taking advantage of its high dielectric constant that is present in this film.

BRIEF DESCRIPTION OF DRAWINGS

FIG. 2 is a table showing experimental data of extracting the endohedral fullerene with a solvent;

FIG. 6 is a view showing dependency of mass peaks on laser intensity in mass spectrometry using a material extracted with chloronaphthalene (a) and a material extracted with tetralin (b);

FIG. 8 is a view showing data of measuring particle diameters in the $C_{60}$ solution (a) and the Li@$C_{60}$ purified solution (b);

FIG. 16 is a perspective view of microstructures using the endohedral fullerene clusters (a) or the endohedral fullerenes (b);

FIG. 20 is a table showing data of evaluating the isolated and purified endohedral fullerene;

EXPLANATIONS OF LETTERS OR NUMERALS

| | |
|---|---|
| 11 | Endohedral fullerene |
| 12 | Empty fullerene |
| 13, 14, 21 | Endohedral fullerene cluster |
| 31, 32, 33, 34, 35, 36, 37, 38, 39 | Mass peak of cluster |

-continued

EXPLANATIONS OF LETTERS OR NUMERALS

| | |
|---|---|
| 101, 102 | Endohedral fullerene cluster |
| 102, 103, 104, 105, 106, 107 | Chemically modifying group |
| 111, 116 | Endohedral fullerene cluster film |
| 113, 115 | Substrate |
| 114 | Empty fullerene film |
| 121, 124 | Polymer film |
| 122, 125 | Polymer |
| 123, 134, 135 | Endohedral fullerene cluster |
| 126, 139, 140 | Endohedral fullerene |
| 131, 136 | Microstructure |
| 132, 133, 137, 138 | Groove |
| 301 | Vacuum container |
| 302 | Vacuum pump |
| 303 | Electromagnetic coil |
| 304 | Alkali metal oven |
| 305 | Tube for introducing alkali metal vapor |
| 306 | Hotplate |
| 307 | Plasma flow |
| 308 | Fullerene oven |
| 309 | Tube for introducing fullerene vapor |
| 310 | Deposition substrate |
| 311 | Deposition film |
| 312 | Substrate bias electric power supply |

BEST MODES FOR CARRYING OUT THE INVENTION

The best modes of the present invention will be described below.

[Method for Producing Endohedral Fullerene]

The method for producing the endohedral fullerene according to the present invention will be described in an order of its synthesis, separation and purification.

(Synthesis of Endohedral Fullerene)

The endohedral fullerene according to the present invention can be synthesized by a plasma irradiation method. In the plasma irradiation method, a plasma flow including ions composed of atoms to be encapsulated inside the fullerene is generated in a vacuum container, and at the same time the fullerene is vaporized with a fullerene oven. As a result, ion in the plasma reacts to the fullerene, and thus the deposited material containing the endohedral fullerene produced by this reaction is generated on the substrate.

(Specific Example of Endohedral Fullerene Synthesis)

Figure 17:
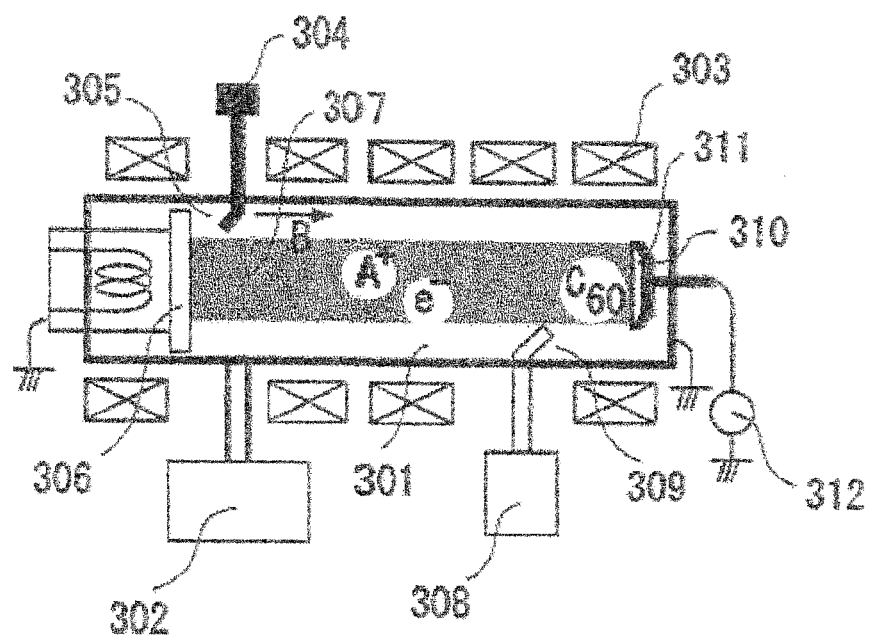
FIG. 17 is a simplified sectional view describing an apparatus for producing the endohedral fullerene by plasma irradiation.

FIG. 17 is a sectional view of a specific example of an apparatus for producing the endohedral fullerene by the plasma irradiation method. The apparatus is composed of a tubular vacuum container 301, a vacuum pump 302 degassing in the vacuum container 301 and an electromagnetic coil 303 for confining the plasma.

First, the atoms such as Li atoms to be encapsulated are sublimated by heating in an oven 304. The generated Li vapor is introduced on a hotplate 306 through an introduction tube 305, and Li is ionized by thermal ionization to generate the plasma composed of Li positive ions and electrons. It is preferable that a vacuum degree in the vacuum container 301 is $10^{-4}$ Pa or less. It is preferable that the hotplate is heated to 2000° C. or above.

The generated plasma is confined within a uniform magnetic field (0.1 to 2 kG) formed by the electromagnetic coil 303. Therefore, a plasma flow 307 which flows in a tube axis direction is formed, and irradiated toward a deposition substrate 310. Simultaneously, the fullerene vapor heated and sublimated by an oven 308 is emitted to the deposition substrate 310. It is preferable to heat the oven 308 to 400 to 650° C.

A negative bias voltage is applied to the deposition substrate 310. The Li ions in the plasma flow 307 are accelerated near the deposition substrate by a formed electric field. The Li ion collides to a fullerene molecule, an endohedral fullerene is formed, and a deposition film 311 including the endohedral fullerene is deposited on the deposition substrate 310. The bias voltage applied to the deposition substrate 310 is preferably −90 to −10 V when the Li endohedral fullerene is synthesized.

Figure 3:
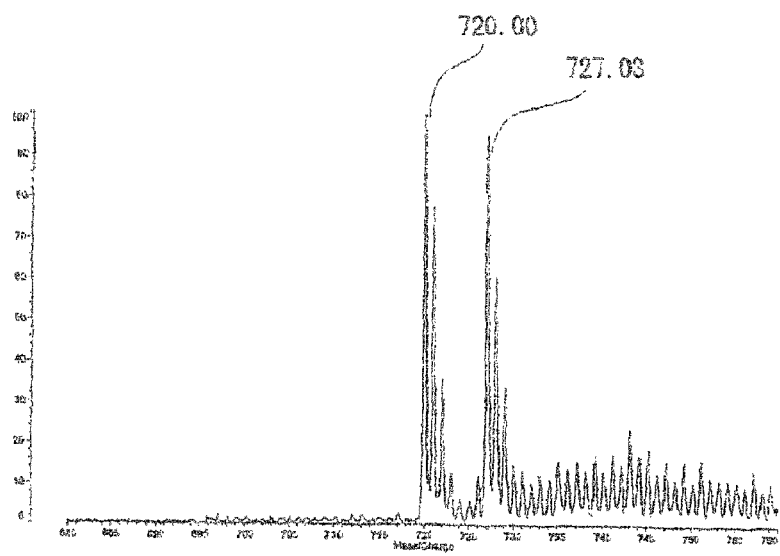
FIG. 3 is a graph showing mass spectrometric data of the endohedral fullerene.

FIG. 3 shows the mass spectrometric data of the deposition film by LD-TOF-MASS. A peak at 727 of a mass number indicating the presence of Li@$C_{60}$ is observed in addition to a peak at 720 of the mass number indicating the presence of the empty fullerene $C_{60}$, confirming that the endohedral fullerene has been produced in the deposition film.

The endohedral fullerene can be synthesized by the plasma irradiation method as described above, and can also be synthesized by the publicly known methods such as a laser evaporation method, an arc discharge method and an ion injection method. For example, when the endohedral fullerene is synthesized by the arc discharge method, the voltage is applied to a positive electrode obtained by baking the atom to be encapsulated and a mixture of graphite and a carbon binder and to a negative electrode composed of graphite to generate an arc discharge. The synthesized endohedral fullerene is included in grime deposited on the electrode by the discharge.

(Separation and Purification of Endohedral Fullerene)

Figure 1:
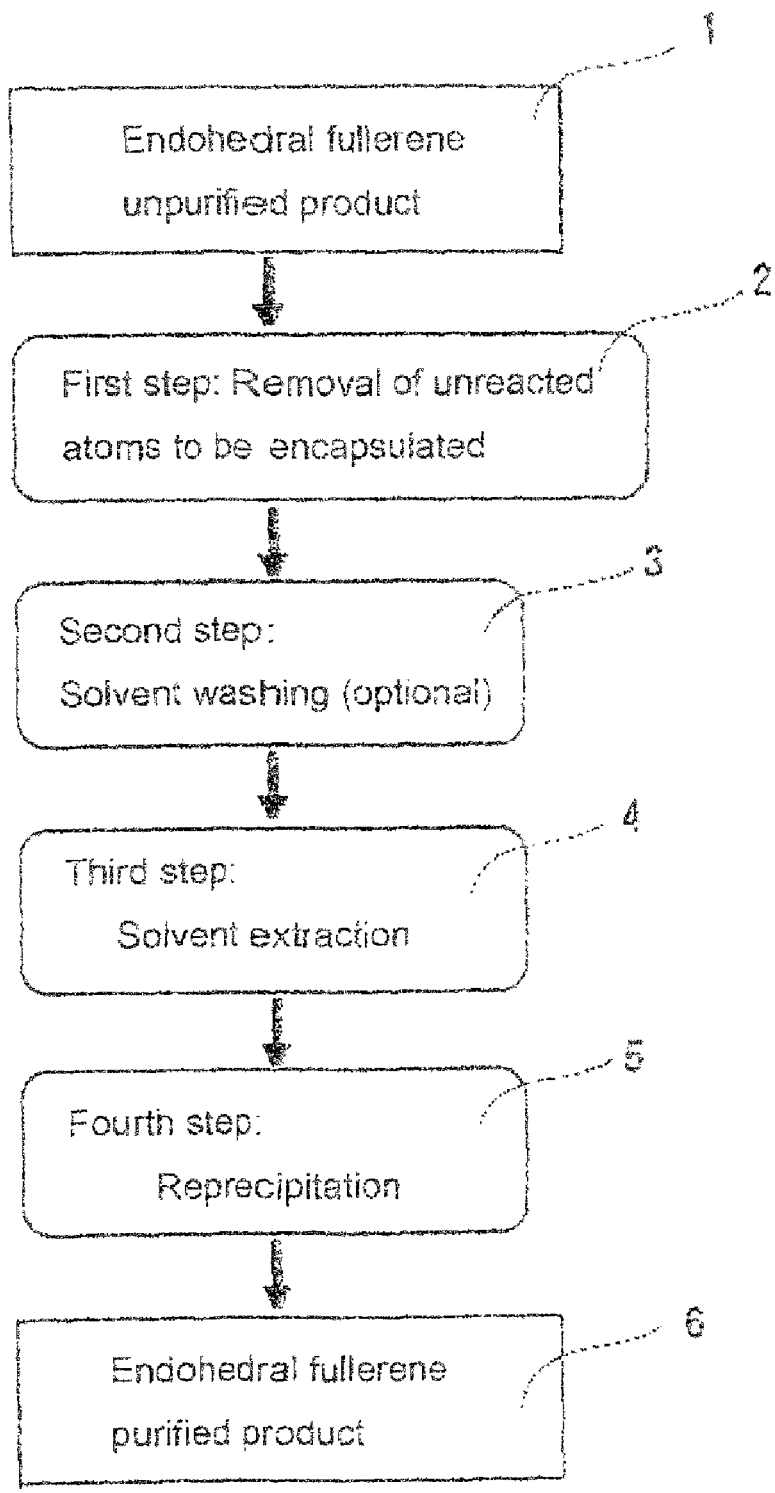
FIG. 1 is a process flowchart of a method for separating and purifying an endohedral fullerene according to the present invention.

FIG. 1 shows the process flowchart of the method for the separation and purification by the solvent extraction of the present invention. The method for the separation and purification of the present invention is composed broadly of 4 steps. A first step is the step of removing the unreacted atoms to be encapsulated from the synthesized endohedral fullerene product. A second step is the step of concentrating the endohedral fullerene in a residual, and in this process, a product obtained in the first step is washed out with the solvent that can dissolve empty fullerenes. A third step is the step of dissolving a product in the second step in a solution to extract the endohedral fullerene with the solvent. A fourth step is the step of dripping the solution, which is a product in the third step into a poor solvent for the endohedral fullerene to precipitate and concentrate the endohedral fullerene.

In the first step 2, an unpurified endohedral fullerene product 1 produced in the synthesis process, i.e., a grime-shaped product peeled and collected from the deposition substrate and the electrode is treated with an aqueous solvent (water, acid or acidic solvent) to dissolve atoms which were not encapsulated inside the fullerene and compounds containing the atoms in the solvent and remove them, and the residual is collected. When the atom to be encapsulated inside the fullerene is Li, the impurities such as Li, Li-containing salts and lithium carbonate are removed in the first step.

In the second step 3, the residual collected in the first step is dissolved in the poor solvent for the endohedral fullerene to concentrate the endohedral fullerene in a residual. As the solvent used in the second step, it is preferable to use the solvent having a high solubility for the empty fullerene, which is the impurity. As the solvent used in the second step, it is preferable to use toluene, a mixed solution of toluene and hexane, xylene, anisole, ethyl benzene, trimethyl benzene, mesitylene or cyclohexane which is a good solvent for the empty fullerene and the poor solvent for the endohedral fullerene. Since the empty fullerene is also removed in the fourth step, which is a final step, the second step can be omitted.

In the third step 4, the residual collected in the first step when the second step 3 is omitted and the residual collected in the second step are dissolved in the good solvent for the endohedral fullerene, the endohedral fullerene is extracted in the solvent, and the solution is collected. As the solvent used in the third step, it is preferable to use the solvent with the high solubility for the endohedral fullerene. As the solvent used in the third step, it is preferable to use halonaphthalene such as chloronaphthalene, tetralin or ODCB with the high solubility for the endohedral fullerene. The ideal solvent for extracting the endohedral fullerene is the solvent exhibiting the high solubility for the endohedral fullerene and simultaneously the low solubility for the impurities such as empty fullerenes. However, at present no solvent having such a property is found. Therefore, in the solvent used in the solvent extraction step in the method for the separation and purification according to the present invention, even when the solubility for the empty fullerene is high, if the solubility for the endohedral fullerene is significantly high, such a solvent can be used. The empty fullerene is separated in the solvent washing step before and/or in the reprecipitation step after the solvent extraction step (third step).

In the third solvent extraction step, the endohedral fullerene in a large amount is included in the residual, which is insoluble in the solvent. It is also possible to wash this residual with the solvent as described in the second step to remove the impurities such as empty fullerenes and yield the endohedral fullerene with high purity in the residual.

FIG. 2 shows the data from the solvent extraction experiment of the endohedral fullerene Li@$C_{60}$. The synthesized endohedral fullerene product containing the impurities such as empty fullerenes was dissolved in toluene, ethyl benzene, mesitylene, tetralin, ODCB (ortho-dichlorobenzene), or Cl-naph (chloronaphthalene), and a color of an extracted solution was evaluated and mass spectrometry by LD-TOF-MS was performed. Generally, the color becomes purple when the amount of $C_{60}$ dissolved in the organic solvent is large, and the color becomes dark-brown when the amount of Li@$C_{60}$ dissolved in the organic solvent is large. From this, it is found that Li@$C_{60}$ is hardly to be dissolved in toluene, ethyl benzene and mesitylene but $C_{60}$ is easily dissolved in these solvents. Meanwhile, it is also found that tetralin, ODCB and Cl-naph dissolve Li@$C_{60}$ well. In the LD-TOF-MS data, 720 and 727 indicate the presence of C60 and Li@$C_{60}$, respectively, and signs (double circle, circle, triangle, etc.) indicate peak intensities in the order from large one to small one. From these results, it is found that toluene, ethyl benzene and mesitylene are hardly dissolve the endohedral fullerene whereas dissolve the empty fullerene well, and that they are suitable for the solvent washing. Meanwhile, it is also found that tetralin, ODCB and Cl-naph dissolve the empty fullerene but also dissolve the endohedral fullerene and are suitable for the solvent extraction. It is also found that in the case of the solvent such as tetralin, which is suitable for the solvent extraction, the endohedral fullerene in a large amount is left in the residual.

The fourth step 5 is the step generally referred to as the reprecipitation method. The solution collected in the third step is dissolved in the poor solvent for the endohedral fullerene to precipitate and concentrate the endohedral fullerene. As the solvent used in the fourth step, it is preferable to use toluene, the mixed solution of toluene and hexane, xylene, anisole, ethyl benzene, trimethyl benzene, mesitylene or cyclohexane which is the good solvent for the empty fullerene and the poor solvent for the endohedral fullerene.

(Specific Example of Isolation and Purification of Endohedral Fullerene)

[First Step]

Water (pure water, purified water) or an acidic solution such as diluted hydrochloric acid is prepared as a treatment liquid. The unpurified product is mixed in the treatment liquid and stirred with ultrasonic wave. Subsequently, centrifugation and/or filtration by a membrane filter are performed. It is preferable to centrifuge at 2,000 rpm or more. An insoluble product precipitated after the centrifugation is collected as the residual. An insoluble product left on the filter is also collected as the residual when the filtration is performed. The unreacted atoms to be encapsulated inside the fullerene and the aqueous solvent are chemically reacted to become a water-soluble substance such as hydroxide. Meanwhile, since the endohedral fullerene is hardly to be dissolved in the water, by taking out the residual, it is possible to isolate the endohedral fullerene from the unreacted atoms to be encapsulated inside the fullerene from the endohedral fullerene.

[Second Step]

The powdered residual collected in the first step is mixed with a toluene solution, which is then stirred with the ultrasonic wave. Subsequently, the centrifugation and/or the filtration by the membrane filter are performed. It is preferable to centrifuge at 2,000 rpm or more. An insoluble product precipitated after the centrifugation is collected as the residual. An insoluble product left on the filter is also collected as the residual when the filtration is performed. The empty fullerene is dissolved in the solvent, and the endohedral fullerene is concentrated in the residual.

[Third Step]

The powdered residual collected in the second step is mixed with a chloronaphthalene solution, which is then stirred with the ultrasonic wave. Subsequently, the solution without performing the filtration by the membrane filter and the residual are collected. It is preferable not to discard and to store the residual because the endohedral fullerene in a large amount is also contained in the residual.

[Fourth Step]

The solution collected in the third step is dropped into the toluene solution. After leaving stand for a certain time period, the filtration by the membrane filter is performed to collect a precipitated product. Since the empty fullerene in a large amount is contained in the solution, it is preferable not to discard and to collect the solution and reuse the empty fullerene.

(Method for Evaluating Ratio of Endohedral Fullerene)

Figure 18:
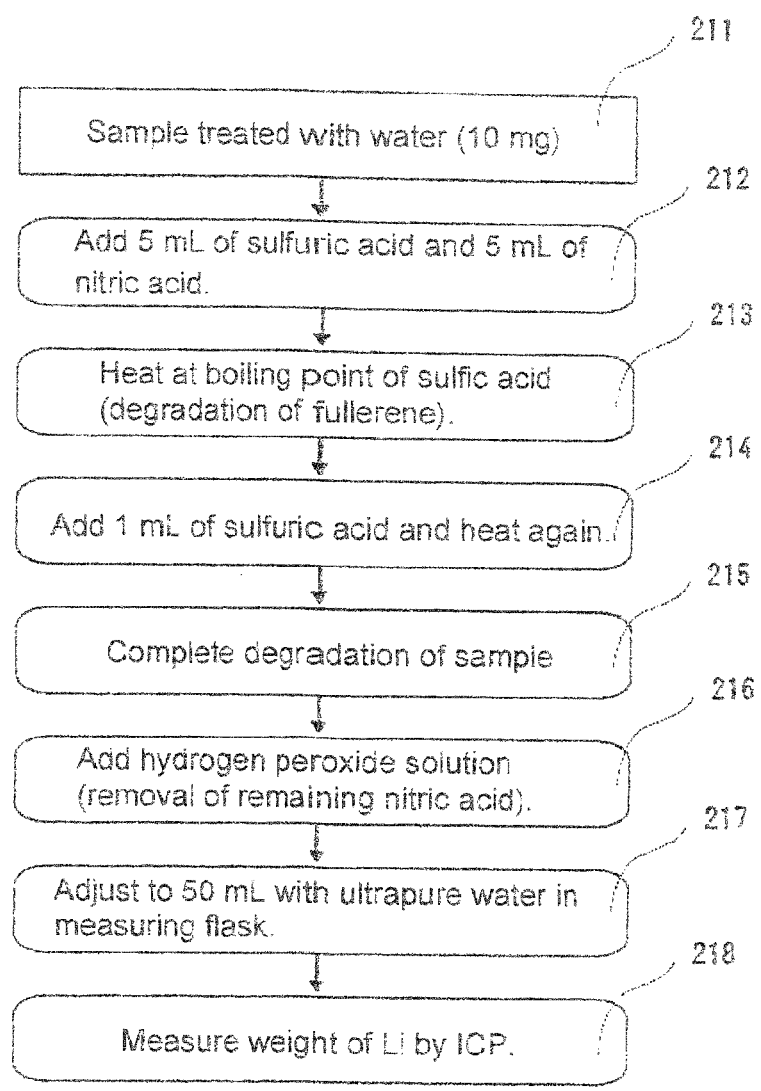
FIG. 18 is a flowchart illustrating a series of evaluation work executed to quantitatively understand the inclusion rate, which is a ratio of the endohedral fullerene contained in the refinement product.

FIG. 18 shows the process flowchart of the method for evaluating a ratio of the endohedral fullerene used when examining the method for isolating and purifying the endohedral fullerene of the present invention. The ratio of the endohedral fullerene is defined as a weight ratio of the endohedral fullerene in a subject to be evaluated (hereinafter referred to as a sample) such as a synthesized product or a purified product. Differently from the conventionally used method for evaluating by the ratio of the peak intensities by the LD-TOF mass spectrometry, this can perform the highly reliable evaluation. A basic idea for the evaluation method shown in FIG. 18 is as follows. First, the weight of the sample is measured, and after removing the unreacted atoms to be encapsulated inside the fullerene, which are included in the sample, a fullerene cage of the endohedral fullerene is degraded by a wet cineration method to bring out the atoms encapsulated therein. Subsequently, the weight of the atoms encapsulated inside is measured by an elemental analysis such as ICP, and its ratio to the weight of the sample is calculated.

The specific example shown in FIG. 18 shows a representative measurement example, and specific numerical values for the weights of the sample and the solutions are shown therein. However, the method for measuring the ratio of the endohedral fullerene of the present invention is not limited to these numerical values. First, the sample is treated with water to remove the unreacted atoms, e.g., Li to be encapsulated inside, and 10 mg is weighed (step 211). Subsequently, 5 mL of sulfuric acid is added, 5 mL of nitric acid is added (step 212), and a resulting mixture is heated at a boiling point of sulfuric acid to degrade the fullerene cage (step 213). Then, 1 mL of nitric acid is added, and a resulting mixture is heated again (step 214) to completely degrade the sample (step 215). Subsequently, a hydrogen peroxide solution is added to remove residual nitric acid (step 216). A resulting solution is adjusted to 50 mL using a measuring flask and ultrapure water (step 217). The weight of Li is measured by ICP (step 218). A ratio of an Li content is calculated by dividing the weight of Li by the weight of the sample. Finally, the ratio of the endohedral fullerene is calculated by the ratio of LI content×727/7.

(Isolation and Purification of Endohedral Fullerenes Other than $Li@C_{60}$)

In the above, the present invention was described by taking $Li@C_{60}$ as an example, but the method for the isolation and purification of the present invention can be used for isolating and purifying $C_n$ (n=60 to 82) encapsulating the alkali metal such as Na, K, Rb, Cs or Fr therein in addition to $Li@C_{60}$, and is highly effective for enhancing the ratio of the endohedral fullerene and the yield. In particular, $C_{60}$ and $C_{70}$ are the materials, which can be synthesized, in large amounts compared with the higher fullerenes, and are the fullerenes with low material cost. The method for the isolation and purification of the present invention has an extremely high industrial value in the respect that the endohedral fullerenes using $C_{60}$ and $C_{70}$ as the base material can be highly efficiently isolated and purified, which has not been known conventionally. Also for the higher fullerenes ($C_n$: $n \geq 72$), by using the method for the isolation and purification of the present invention, it becomes possible to produce the endohedral fullerenes with higher purity compared with the cases using the method for the isolation and purification conventionally known.

DEFINITION OF TERMS

Here, significance of terms used herein is revealed.

(Fullerene, Fullerene-Based Material)

The "fullerene" is a hollow carbon cluster substance represented by $C_n$ (n=60, 70, 76, 78 . . . ), and can be including, for example, $C_{60}$ and $C_{70}$. The "endohedral fullerene" is the carbon cluster substance where the atom or a molecule other than carbon has been confined in a hollow part of a cage-shaped fullerene molecule. The atom or the molecule which is confined in the fullerene molecule (cage) is referred to as the atom (molecule) to be encapsulated inside, and the confined atom (molecule) is referred to as the atom (molecule) encapsulated inside.

The "fullerene-based material" is the material produced based on the fullerene, and is a concept encompassing the endohedral fullerenes, hetero-fullerenes, chemically modified fullerenes and fullerene polymers.

As the fullerene, which is the raw material for the endohedral fullerene, it is possible to use not only one type of the fullerene but also mixed fullerenes. The "mixed fullerenes" indicate the carbon cluster substance obtained by mixing different types of multiple fullerenes. When the fullerene is produced by a resistant heating method or the arc discharge method, the produced fullerene is composed of 70 to 85% $C_{60}$, 10 to 15% $C_{70}$ and remaining higher fullerenes such as $C_{76}$, $C_{78}$ and $C_{84}$ in weight ratio. In the production of the fullerene by a combustion method, the weight ratio of $C_{60}$ and $C_{70}$ is higher than that of the higher fullerenes. Therefore, $C_{60}$ and $C_{70}$ are more easily available and more inexpensive than the other higher fullerenes. The mixed fullerene composed of $C_{60}$ and $C_{70}$ is commercially available from Frontier Carbon, and easily available.

Furthermore, as the raw material for the endohedral fullerene, it is possible to use nitrogen hetero-fullerenes and oxidized fullerenes in place of the fullerene. These substances are byproducts synthesized in large amounts when the endohedral fullerene is produced by treating the fullerene with the plasma, and it is possible to reuse them to produce the endohedral fullerene.

(Isolation and Purification)

As described previously, the endohedral fullerene can be synthesized by the laser evaporation method, the arc discharge method, the ion injection method and the plasma irradiation method. The material synthesized by these methods and before the isolation and purification is referred to as a "synthesized product" or a "produced product". The material having the increased purity by the isolation and purification is referred to as an "isolated and purified product" or simply a "purified product".

The "solvent extraction" refers to the isolation method in which a mixed substance containing a target substance is dissolved in the good solvent for the target substance to transfer the target substance to a solvent side. Here, the "good solvent" is the solvent exhibiting the high solubility for a solute. On the contrary, the "poor solvent" is the solvent exhibiting the low solubility for the solute.

The "solvent washing" refers to the isolation method in which the mixed substance containing the target substance is dissolved in the poor solvent for the target substance to transfer the target substance to a residual side.

The "reprecipitation method" is the purification method in which the target substance is precipitated by dropping the good solvent in which the target substance has been dissolved into the poor solvent and mixing them. In the method for the isolation and purification of the present invention, this treatment is performed for the purpose of further increasing the purity of the target substance whose purity has been once increased by dissolving in the good solvent.

The "treatment with the water or the acid" is the treatment performed for removing the not encapsulated atom to be encapsulated inside, such as an alkali metal, which is included in the produced endohedral fullerene product. The "unreacted atom to be encapsulated inside" is used in the same meaning as the "not encapsulated atom to be encapsulated inside". As the water, the pure water or the purified water, which contains almost no impurity, is used, and as the acid, it is preferable to use the acid, which dissolves the atom to be encapsulated inside (also including the case of reacting to dissolve). In the case of using in mass production, it is preferable to use the highly safe acid. For example, it is possible to use diluted hydrochloric acid. The "treatment" referred to here is the step of making the produced product a powder product, then mixing and stirring it with the water or the acid, or washing it with the water or the acid and filtrating with the filter to collect the residual. The treatment with the water or the acid is referred to as the "water treatment" in short in some cases herein, but the treatment with acid is also included in such a case.

[Novel Molecular Structure of Endohedral Fullerene]

The present inventors researched and developed for the purpose of isolating and purifying the endohedral fullerene with high purity in an industrially available amount (several milligrams to several grams), based on the synthesized Li endohedral fullerene product obtained by the plasma irradiation method, and obtained the results described above. For the purity of the endohedral fullerene, they also developed the method for measuring the purity with high reliability and reproducibility, which was different from the conventional method using the peak intensity in LD-TOF-MASS, and collected the data. Furthermore, they attempted to synthesize the endohedral fullerenes under various conditions and aimed at producing the endohedral fullerene with purity of 50% or higher by repeating the solvent extraction using optimal solvents, but obtained the data showing that there was an upper limit for the ratio of the endohedral fullerene in the product purified by the solvent extraction.

Figure 4:
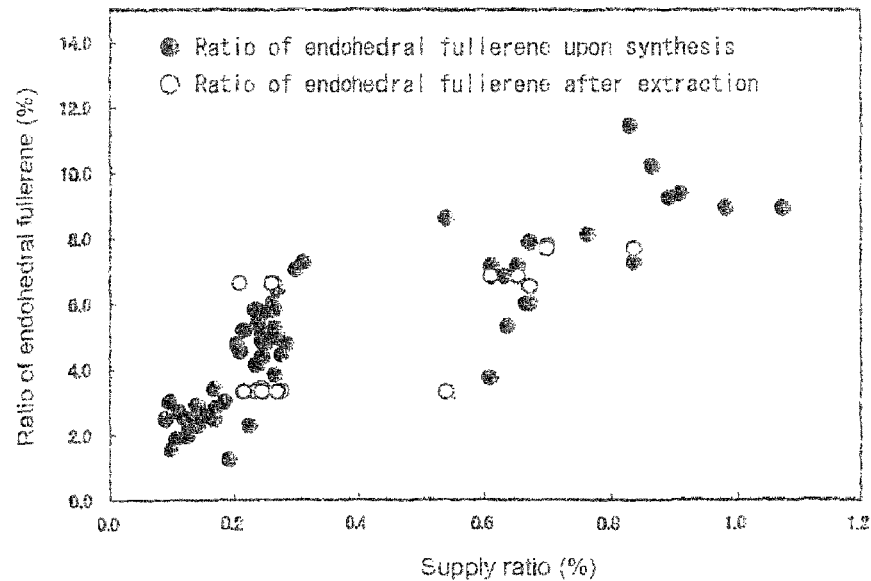
FIG. 4 is a graph showing the dependency of a ratio of the endohedral fullerene against a raw material supply ratio.

FIG. 4 is a graph showing the dependency of the ratio of the endohedral fullerene on the raw material supply ratio. When the endohedral fullerene is synthesized by the plasma irradiation method, the amount of the supplied Li ion can be measured by detecting an ion electric current which runs on the deposition substrate, and the amount of the supplied fullerene can be measured by detecting the change of the amount of the fullerene filled in the fullerene oven. Each amount supplied can be set by changing the temperature in a sublimation oven of each material. FIG. 4 was obtained by plotting the deposited product synthesized by changing the ratio of supplied $Li/C_{60}$ amounts from 0.1 to 1 to the ratio of the endohedral fullerene in the purified product extracted under a constant solvent extraction condition. From the figure, it has been found that if the supply ratio of Li to the fullerene is increased, when the supply ratio is 0.8 or less, the ratio of the endohedral fullerene is increased but when the supply ratio exceeds 0.8, the ratio of the endohedral fullerene is saturated to 8 to 11%.

(Ratio of Endohedral Fullerene Under Various Purification Conditions)

Subsequently, when the synthesis condition was constant and the purification condition was altered, then the ratio of the endohedral fullerene was measured. The results are shown in Table 1.

TABLE 1

| Purification method | Li wt % | C wt % | MS727 | Yielded amount | Ratio of endohedral fullerene |
|---|---|---|---|---|---|
| Method 1 | 0.049 | 92.1 | Presence | 15.6 mg | 5.09% |
| Method 2 | 0.042 | 96.2 | Presence | 15.0 mg | 4.36% |
| Method 3 | 0.070 | 88.0 | Presence | 8.6 mg | 7.27% |
| Method 4 | 0.042 | 90.0 | Presence | 17 mg | 4.36% |

Method 1: Residual after extracting twice with chloronaphthalene→Washing once with $CS_2$
Method 2: Solution of extracting once with tetralin→Reprecipitation with toluene
Method 3: Solution of extracting once with chloronaphthalene→Reprecipitation with toluene
Method 4: Residual after extracting once with tetralin→Washing twice with $CS_2$ From Table 1, it was shown as was expected that the ratio of the endohedral fullerene in the purified product by the solvent extraction was less than 8%.

Also, the present inventors performed the experiment purifying the endohedral fullerene by HPLC. As a result, even if HPLC was repeated any times, the ratio of the endohedral fullerene did not exceed widely over the above values.

(Dependency of Mass Spectrometric Data on Laser Intensity)

Subsequently, the dependency of the LD-TOF mass spectrometric spectrum on the laser intensity was examined using the purified products isolated and purified using chloronaphthalene or tetralin, respectively as the solvent. FIGS. 6(a) and (b) are the figures showing the dependency of the mass peaks on the laser intensity by mass spectrometry using the material extracted with chloronaphthalene or the material extracted with tetralin, respectively. Mass numbers 720 and 727 are detection signal intensities corresponding to $C_{60}$ and $Li@C_{60}$, respectively, and correspond to the density of the substance locally present in the measured sample. In both FIGS. 6(a) and (b), there is a tendency that when the intensity of the laser irradiated to the sample is large, the signal intensity corresponding to 727 becomes small and the signal intensity corresponding to 720 becomes large.

(Endohedral Fullerene Cluster)

From the above experimental data, the present inventors have hypothesized that the endohedral fullerene synthesized by the plasma irradiation and purified by the solvent extraction is not present as a single molecule and is present as a cluster structure where multiple empty fullerenes surround the endohedral fullerene and are bound to the endohedral fullerene.

Figure 5:
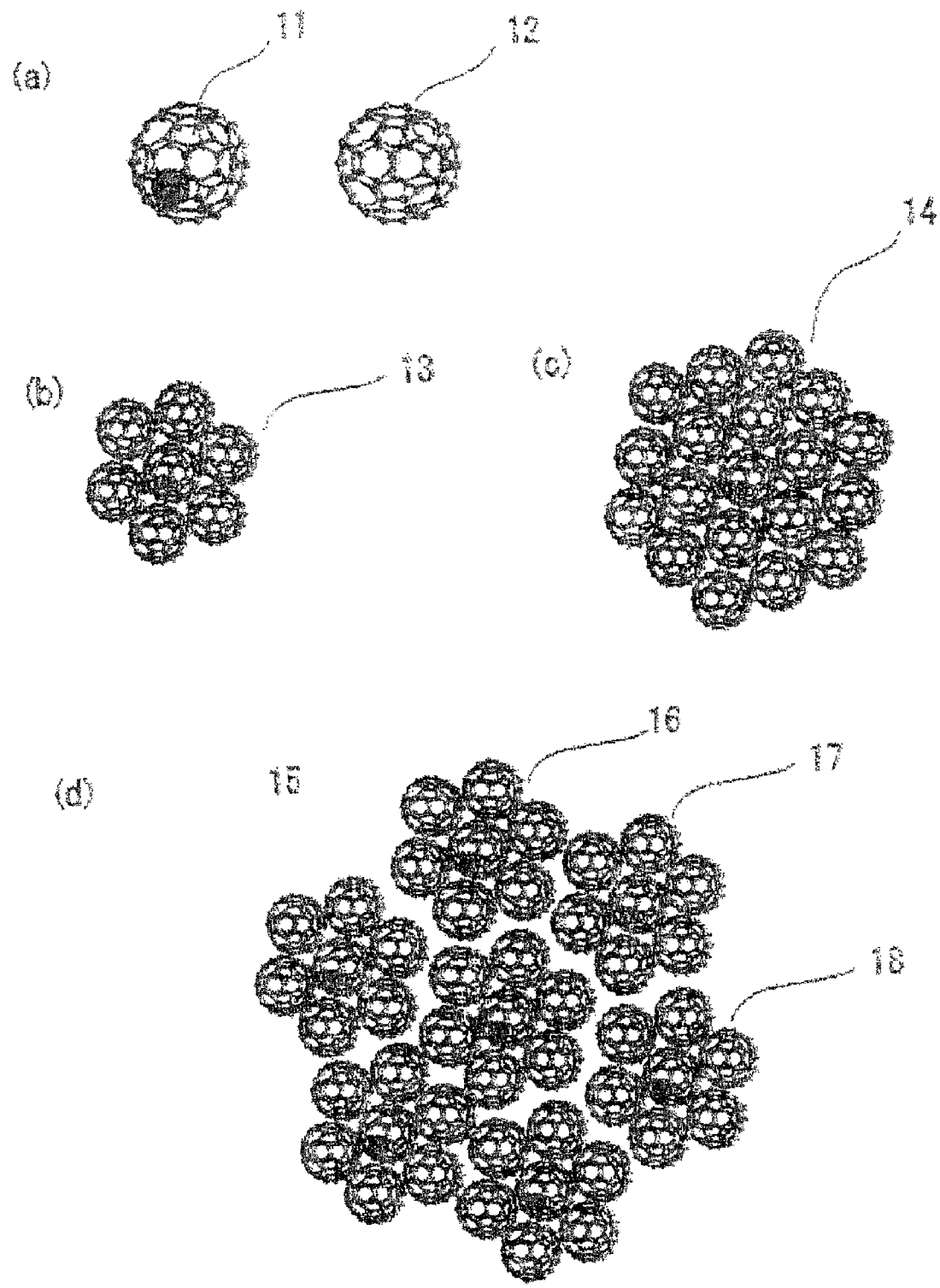
FIG. 5 is a view showing molecular structures of an empty fullerene and the endohedral fullerene (a) and the molecular structures of endohedral fullerene clusters (b), (c), and (d)

FIG. 5(b) is the figure showing the molecular structure of the endohedral fullerene cluster 13 where one layer of the empty fullerenes surrounds and is bound to one endohedral fullerene. FIG. 5(c) is the figure showing the molecular structure of the endohedral fullerene cluster 14 where two layers of the empty fullerenes surround and are bound to one endohedral fullerene. According to Nonpatent Literature 1, when the carbon cluster is most closely packed with the empty fullerenes alone, the molecular structure takes a regular dodecahedron and is the most stable. It has been described that when one layer of the molecules surrounds one molecule, the stable structure is made of 13 molecules including the central molecule, and that when two layer of the molecules surround one molecule, the stable structure is made of 55 molecules including the central molecule. Since the molecular sizes of the endohedral fullerene and that of the empty fullerene are almost the same, in the case of the cluster 13 (monolayer structure), it is conceivable that the 12 empty fullerenes are bound around one endohedral fullerene to become stable. Also in the case of the cluster 14 (bilayer structure), it is conceivable that the 54 empty fullerenes are bound around one endohedral fullerene to become stable. In the case of the monolayer structure, the ratio of the endohedral fullerene is 7.7% by calculating from 1/13. In the case of the bilayer structure, the ratio of the endohedral fullerene is 1.8% by calculating from 1/55. This calculation result is consistent with the data that the ratio of the endohedral fullerene is 8 to 11% in maximum even when the synthesis condition and the purification condition are changed and is supported the theory of the cluster structure.

The present inventors further hypothesized the followings as the properties of this novel material.

(1) The endohedral fullerene as the single molecule (structure of the molecule 11 shown in FIG. 5(a)) is extremely unstable, and the atom encapsulated therein is easily brought out. This is supported by the description that "the endohedral fullerene is unstable in atmosphere" in Nonpatent Literature 1. This is also consistent with the data of the dependency of the mass spectrometric peak on the laser intensity in FIG. 6. When the laser intensity is increased, the cluster structure is broken down, and both the empty fullerenes and the endohedral fullerene become free single molecules. At that time, the atom, which is encapsulated inside the endohedral fullerene, is easily run off. Thus, the signal intensity corresponding to the endohedral fullerene becomes small whereas the signal intensity corresponding to the empty fullerene becomes large.

(2) The endohedral fullerene as the single molecule is hardly to be dissolved in the solvent, but the cluster structure binding the empty fullerenes become soluble in some solvents. This feature as well as the endohedral fullerene's stable nature in atmosphere is excellent points of the endohedral fullerene cluster. According to Nonpatent Literature 1, it has been described that "the endohedral fullerene $M@C_{60}$ is insoluble in various solvents." However, the endohedral fullerene cluster of the present invention is synthesized by the plasma irradiation and purified by the solvent extraction, therefore, takes the cluster structure where the empty fullerenes are bound to the endohedral fullerene and is soluble in the solvent.

FIG. 5(d) is the figure showing the larger cluster structure where the multiple endohedral fullerene clusters such as endohedral fullerene clusters 16, 17, 18 have gathered together. It is conceivable that the endohedral fullerene cluster is present as not only the single cluster but also the larger cluster as shown in FIG. 5(d).

[Structural Analysis of Endohedral Fullerene Cluster]

The present inventors performed the structural analysis for proving the above hypothesis of the endohedral fullerene cluster structure.

(Ultraviolet Absorption Analysis, and NMR Measurement)

Even when a free empty fullerene supposed not to be bound to the endohedral fullerene and incapable of being removed is present in the purified product by the method for isolation and purification of the present invention, the ratio of the endohedral fullerene has the upper limit.

Figure 7:
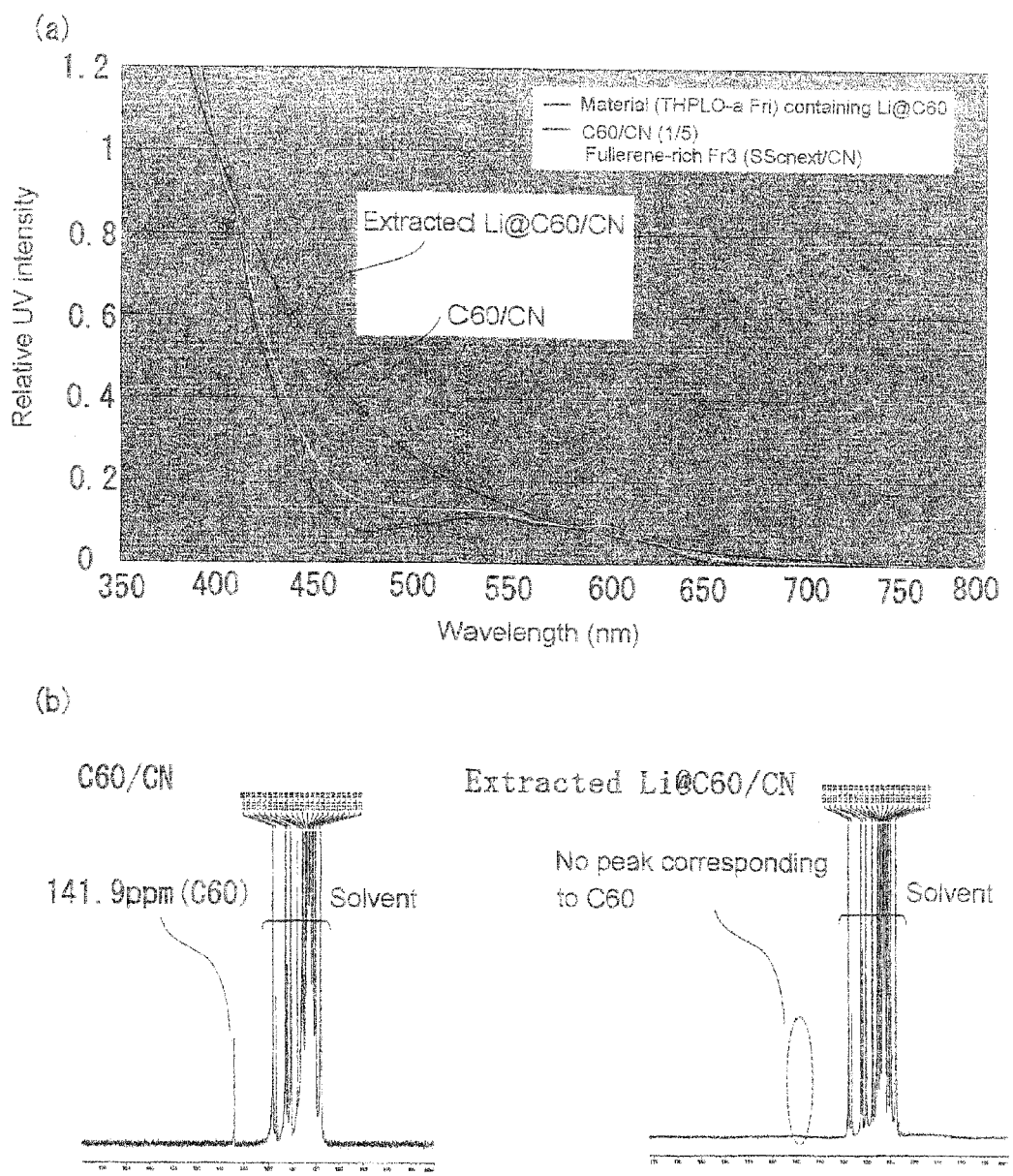
FIG. 7 is a view showing difference in physical properties between an Li@$C_{60}$ purified solution (a) and a $C_{60}$ solution (b)

FIG. 7(a) shows the data of comparing ultraviolet absorption analysis spectra of the chloronaphthalene (CN) solution of the $Li@C_{60}$ purified product and the chloronaphthalene solution in which $C_{60}$ alone was dissolved. In the case of $C_{60}$, a characteristic light absorption region around a wavelength of 470 nm is observed whereas in the case of the $Li@C_{60}$ purified product, the same light absorption region is not observed. From this, it has been found that the $Li@C_{60}$ purified product is the different substance from $C_{60}$.

Subsequently, FIG. 7(b) shows the data of comparing the NMR measurement of the chloronaphthalene solution (CN) of the $Li@C_{60}$ purified product and the chloronaphthalene solution of $C_{60}$. In the case of $C_{60}$, an absorption peak of an electromagnetic wave at 141.9 ppm indicating the presence of $C_{60}$ is observed, whereas in the case of the $Li@C_{60}$ purified product, no absorption peak indicating the presence of $C_{60}$ is observed. Thus, this indicates that no free $C_{60}$ is present in the $Li@C_{60}$ purified product.

Meanwhile, in the LD-TOF mass spectrometry, the peak of the mass number 720 corresponding to $C_{60}$ is observed. Thus, it is concluded that the $Li@C_{60}$ purified product has no free $C_{60}$ and takes the cluster structure where the endohedral fullerene is bound to the empty fullerenes. It is conceivable that the peak of the mass number 720 is observed because these bonds are cleaved by laser irradiation in the LD-TOF mass spectrometry.

(Particle Diameter Measurement)

The particle diameter of the $Li@C_{60}$ purified product in the solution was measured by a dynamic light scattering method. For the comparison, the particle diameter of $C_{60}$ was also measured. FIG. 8(a) shows a particle diameter distribution of $C_{60}$, which has a diameter peak of about 0.7 nm. On the contrary, it was found that the $Li@C_{60}$ purified product had the particle diameter distribution having the diameter peaks of 4 to 6 nm. The measurement was further repeated by changing the sample, and then it was found that the $Li@C_{60}$ purified product had the particle diameter distribution having the diameter peaks of 4 to 10 nm.

(TEM Observation)

Figure 9:
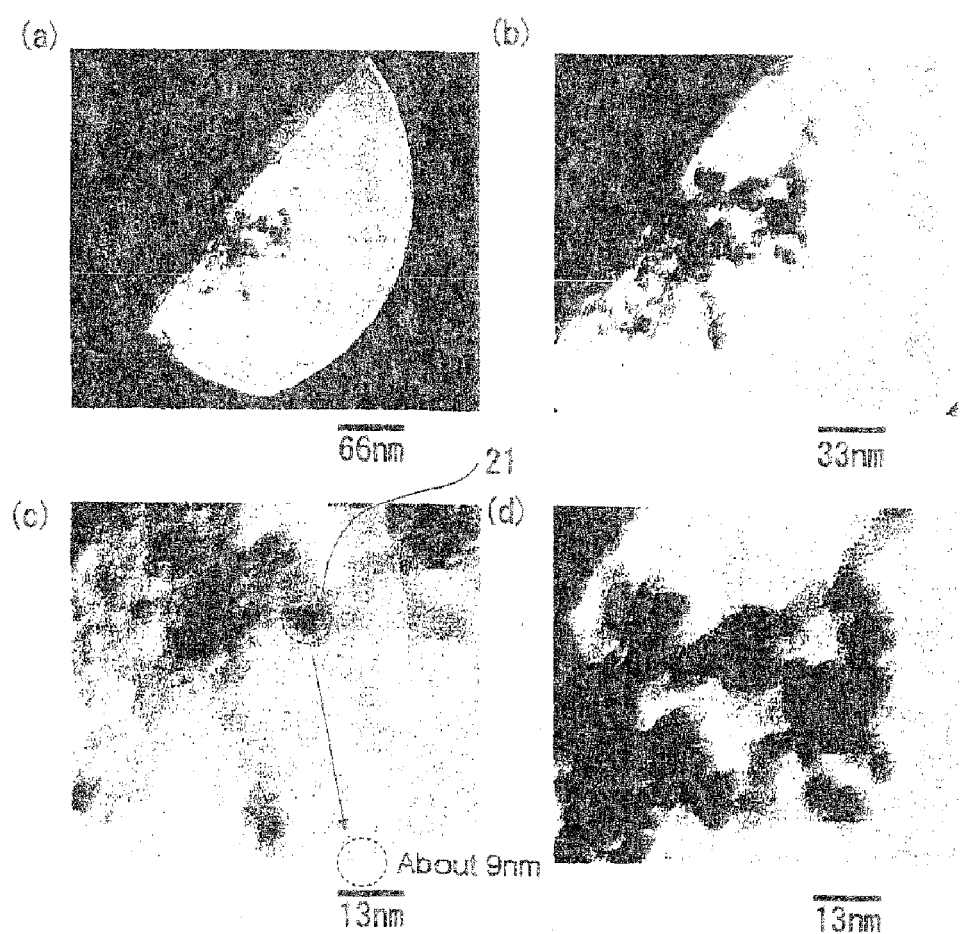
FIG. 9 is a view showing photographs (a) to (d) of the Li@$C_{60}$ purified product observed by TEM.

FIG. 9(a) to (d) are the photographs of the observation of the Li@$C_{60}$ purified product by TEM. As shown in FIG. 9(c), it has been found that the Li@$C_{60}$ purified product is the particle having the diameter of about 9 nm.

From the above measurement of the particle diameter, it can be thought that in the Li@$C_{60}$ purified product, one layer or two layers of the empty fullerenes are bound to the endohedral fullerene to make the molecular cluster of about 2.1 nm to 3.5 nm and multiple clusters of such a structure are further bound to form the larger cluster.

(Cluster Mass Peak by Mass Spectrometry)

Figure 10:
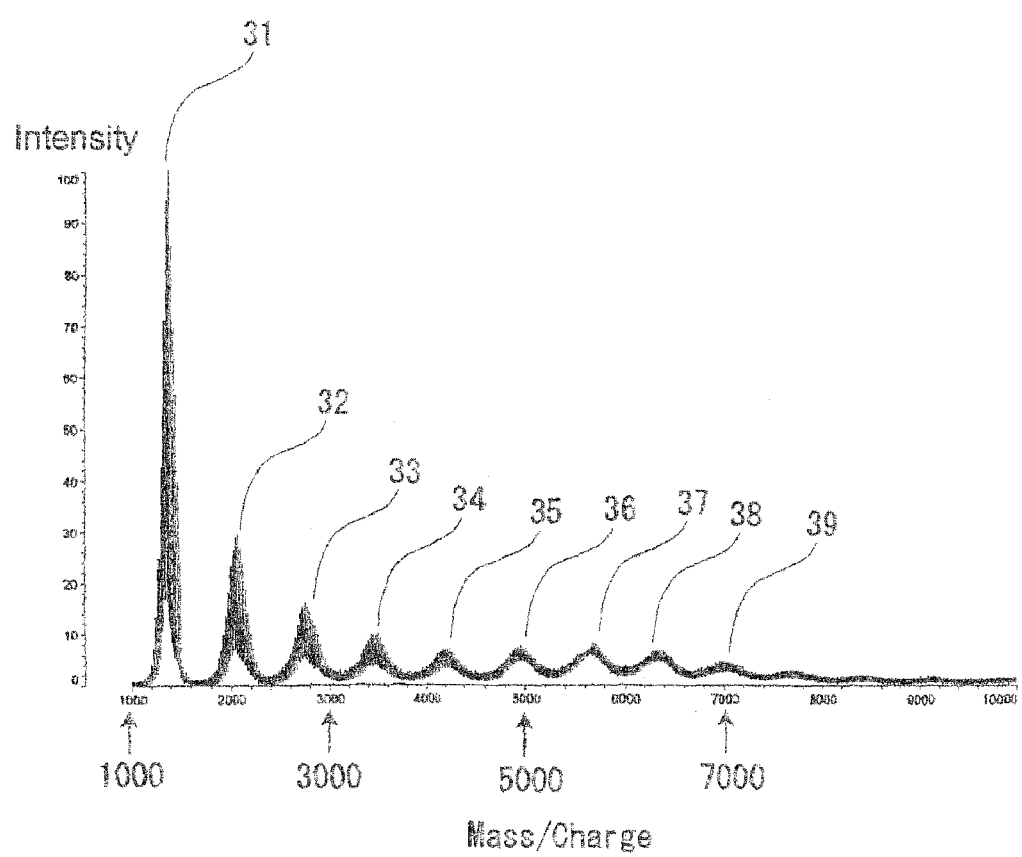
FIG. 10 is a view showing mass spectrometric data in a high mass side of the Li@$C_{60}$ purified product.

FIG. 10 shows the data of the LD-TOF mass spectrometry in a high mass region (mass numbers>1000) of the Li@$C_{60}$ purified product. It has been found that the mass peak 31 corresponding to Li@$C_{60}$ ($C_{60}$) and the mass peaks 32 to 39 corresponding to Li@$C_{60}$ ($C_{60}$)$_n$ (n=2 to 9) are present. The same high mass region was observed for the sample of $C_{60}$ alone, but no mass peak indicating the presence of the higher cluster as observed in the Li@$C_{60}$ purified product was observed.

(X Ray Analysis of Crystal Structure)

Figure 11:
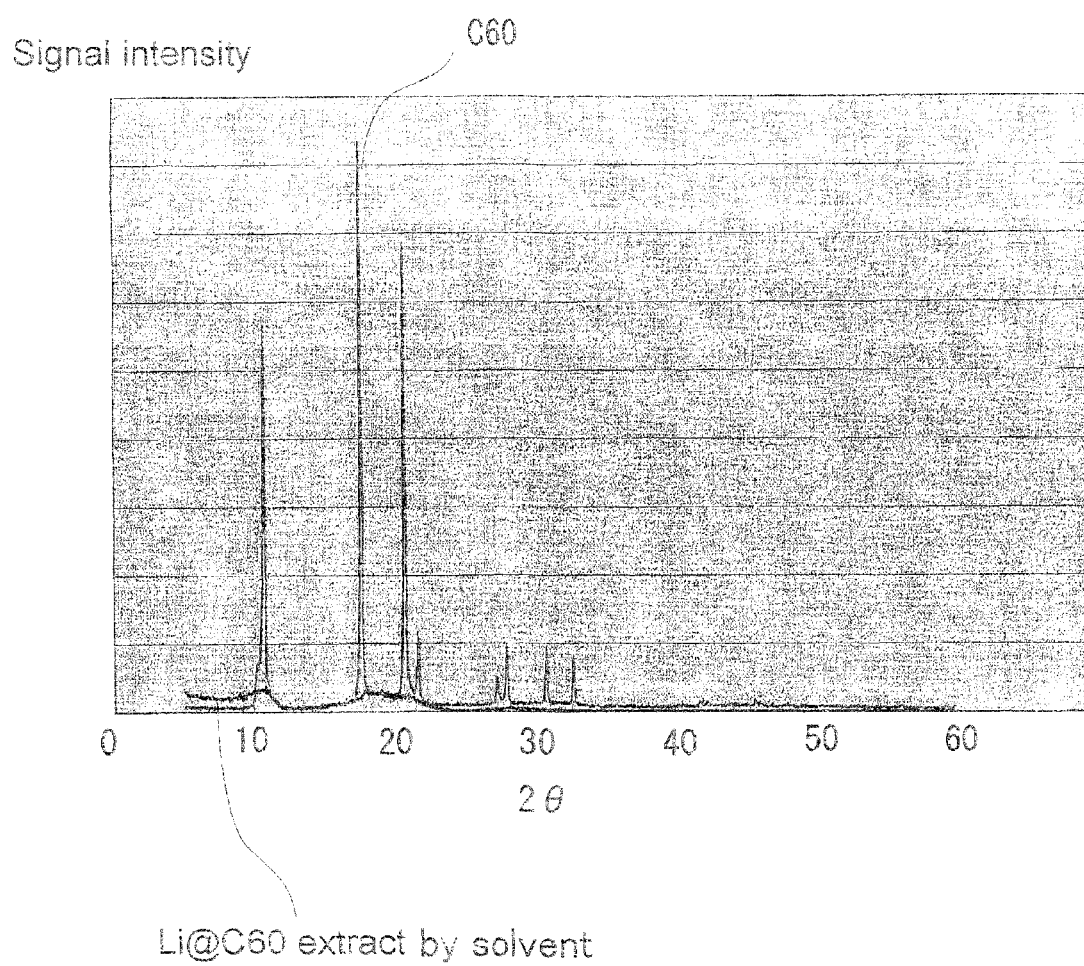
FIG. 11 is a view showing X ray analysis data of crystal structures of $C_{60}$ and the Li@$C_{60}$ purified product.

FIG. 11 is the figure showing the X ray analysis data of the crystal structures of $C_{60}$ and the Li@$C_{60}$ purified product. $C_{60}$ exhibits multiple strong peaks indicating that it has the crystal structure whereas the Li@$C_{60}$ purified product exhibits no remarkable peak.

From the results of the mass spectrometry and the results of the X ray analysis, it is conceivable that although $C_{60}$ is in a crystal state, its binding force is weak and its bond is easily cleaved by laser irradiation whereas the Li@$C_{60}$ purified product takes the cluster structure, and the clusters do not have a large interaction to form the crystal structure one another but the bonds inside the cluster are bound with the relatively strong force. Though depending on the intensity of the laser irradiation, it is conceivable that the bond in the endohedral fullerene cluster is not easily cleaved by the laser irradiation with usual intensity.

(Difference from Conventional Endohedral Fullerenes)

The endohedral fullerene purified product according to the present invention is different from the Li@$C_{60}$ purified product (Nonpatent Literature 2) by the solvent extraction and reported by Campbell's group. They synthesized the endohedral fullerene by injecting Li ion into the deposition film composed of the empty fullerene by the ion injection method, then dissolved the deposition film in $CS_2$ and purified the endohedral fullerene by HPLC. Since the empty fullerenes in the deposition film can not move freely, even when Li is injected into the empty fullerene to form the endohedral fullerene, the molecular cluster can not be formed by gathering together the empty fullerenes around it. Also, in the subsequent purification step, Li atoms, which were not encapsulated inside the fullerene, are not removed, and it is highly likely that the considerable amount of the Li atoms is contaminated in the purified product. They also evaluated the ratio of the endohedral fullerene by the LD-TOF mass spectrometry, but as already described above, it is not reliable and reproducible that the ratio of the endohedral fullerene is evaluated by the LD-TOF mass spectrometry.

On the contrary, since the Li@$C_{60}$ purified product of the present invention is synthesized by the plasma irradiation method, the fullerene molecule in a vacuum space can move freely. Thus, it is possible that the empty fullerenes relatively easily gather around the formed endohedral fullerene to form the cluster. Furthermore, the atoms to be encapsulated inside, which were not actually encapsulated, are removed, the endohedral fullerene is extracted with the solvent and the empty fullerene is removed in the method for the isolation and purification of the present invention. Thus, it is possible to produce the endohedral fullerene cluster with high purity. For the purity of the endohedral fullerene (ratio of the endohedral fullerene), the present inventors developed the novel evaluation method, and could obtain the data with high reliability and reproducibility. In the endohedral fullerene cluster of the present invention, the purity of the endohedral fullerene is about 4 to 10%, but the free empty fullerene is scarcely present, and thus, it can be said that the purity of the endohedral fullerene cluster is considerably high.

(Types of Fullerenes, Endohedral Material Other than Li)

The endohedral fullerene cluster of the present invention is not limited to the cluster produced by binding multiple $C_{60}$ to Li@$C_{60}$. It is also conceivable that the endohedral fullerene, which encapsulates the alkali metal such as Na, K, Rb, Cs or Fr other than Li inside the more common fullerene $C_n$ (n=60 to 82) and is purified by the method for the isolation and purification of the present invention takes the cluster structure binding the multiple empty fullerenes around it. In this case, it is possible to extract the endohedral fullerene with the solvent as is the case with the endohedral fullerene cluster composed of Li@$C_{60}$, and the cluster has the excellent nature, e.g., it is stable in the atmosphere.

[Practical Application of Endohedral Fullerene]

The endohedral fullerene cluster newly produced by the present inventors is the novel material, which is applicable to various practical applications. Its practical applications can be classified into four forms.

(Modified Fullerene)

The fullerene is inert and non-toxic, and its molecular size is in the order of nanometer. Thus, the fullerene easily interacts with a cell, a protein and a virus, and is anticipated to be applied to pharmaceuticals such as a drug delivery system.

Figure 12:
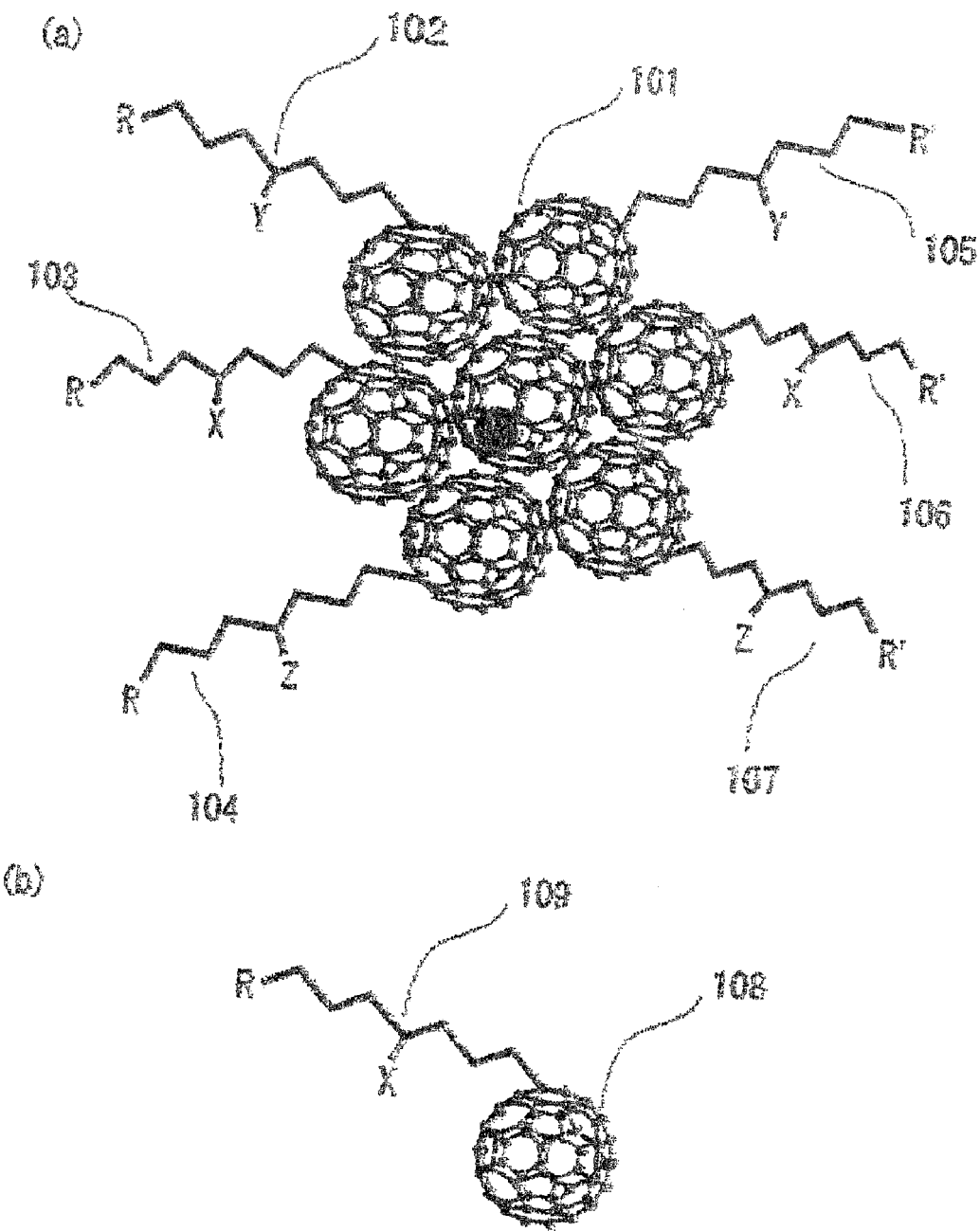
FIG. 12 is a view showing the molecular structure of a specific example of a modified fullerene composed of an endohedral fullerene cluster (a) and the molecular structure of a modified fullerene obtained by adding a chemically modifying group to the empty fullerene (b)

FIG. 12(b) is the figure showing the molecular structure of the conventional modified fullerene, which has the structure adding a chemically modifying group 109 at a fullerene molecule 108. Depending on the various practical applications such as cancer therapy, AIDS therapy and gene therapy, drugs obtained by controlling the structure of the chemically modifying group 109 have been studied. However, the number of the modifying group, which can be added onto the surface of one fullerene molecule, is limited, and it is difficult to produce the drug for efficiently treating multiple symptoms. If it can be detected what location in human body the drug is located at after administering the drug, it is useful for appropriately treating. If the atom having an unpaired electron can be encapsulated inside the fullerene, the location where the drug is present can be specified by NMR or ESR. However, the endohedral fullerene alone is very unstable, and the atom encapsulated inside the fullerene easily runs off. Thus, it has been difficult to practically apply the endohedral fullerene to the drug.

FIG. 12(a) is the figure showing the molecular structure of the modified fullerene of the present invention adding chemically modifying groups 102 to 107 to the endohedral fullerene cluster 101 of the present invention. The modified fullerene of the present invention has the structure where the endohedral fullerene is surrounded with multiple fullerenes. Thus the endohedral fullerene is present stably. Accordingly, by using the endohedral fullerene, which encapsulates the atom having the unpaired electron inside the fullerene, it becomes possible to detect the location of the administered drug. It is also possible to add many chemically modifying groups to the endohedral fullerene cluster 101. Thus multiple modifying groups can be added to respond to various symptoms. It is also possible to add the atom detectable by ESR or NMR to some modifying groups per se. Furthermore, it is also possible that the drug is administered to a patient, when the drug reaches a diseased part, the location of the drug is identified and then the endohedral fullerene cluster is decomposed into fullerene unit to send the appropriate drug to the different diseased part.

(Fullerene Thin Film)

Figure 13:
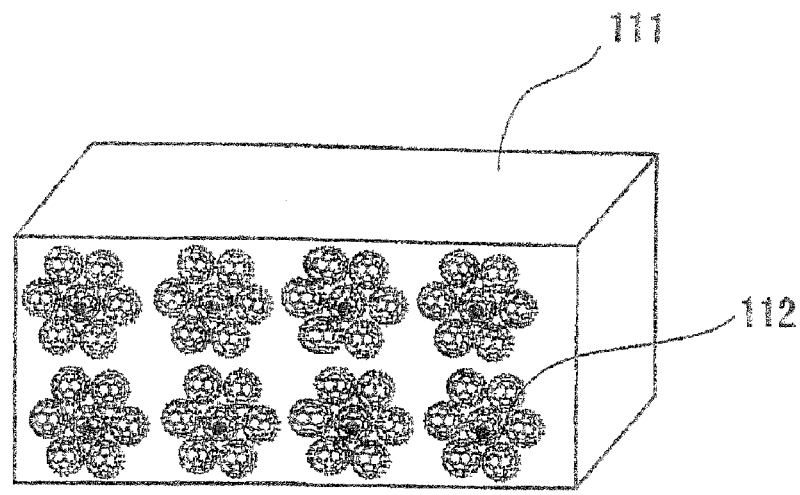
FIG. 13 is a perspective view of the cross section of the fullerene thin film that contains the endohedral fullerene clusters.

FIG. 13 is a perspective view of the fullerene thin film formed by depositing the endohedral fullerene cluster of the present invention. In the fullerene thin film of the present invention, the endohedral fullerene is highly stable because the endohedral fullerene is surrounded with multiple empty fullerenes.

The fullerene thin film of the present invention can be practically applied to optical memories utilizing the near-field light. It is an urgent issue to develop the method for realizing high density recording with manufacturing information recording apparatuses having a large capacity. It is said that optical recording and magnetic recording using conventional magnetic materials will have a physical limit in near future. For example, in the optical recording, the size of a recording pit is defined with a diffraction limit of the light, and it has been described that the limit of its recording density is 50 Gbit/inch$^2$. Meanwhile, in the magnetic recording typified by HDD, the limit of its recording density is 1 Tbit/inch$^2$ in horizontal magnetic recording currently used mainly and even in vertical magnetic recording whose mass production was just started due to the presence of thermal fluctuation of the magnet and Bloch wall at a sign inversion part with density growth.

Meanwhile, if the near-field light studied in recent years is utilized, differently from diffusion light used for the conventional optical recording, the recording density is not limited by the diffraction. By using the thin film composed of the endohedral fullerene cluster of the present invention for recording media in the near-field light recording, the recording apparatus with ultrahigh density can be realized. The information is written by controlling the location of the atom encapsulated inside the endohedral fullerene in the fullerene thin film shown in FIG. 13 by the near-field light, and the information is read out by detecting the location of the endohedral atom. For example, when the endohedral fullerene cluster where one endohedral fullerene is surround with one layer of the empty fullerenes as shown in FIG. 5(b) is used, an interval between the endohedral fullerenes is 3 to 4 nm, and about 40 Tbit/inch$^2$ of the recording density can be realized. There is also an advantage that adjacent recording elements are not interfered because the endohedral fullerene is isolated from the adjacent endohedral fullerene by at least two empty fullerenes. The optical memory described above can be realized by not only the fullerene thin film but also the fullerene microstructure described later.

Figure 14:
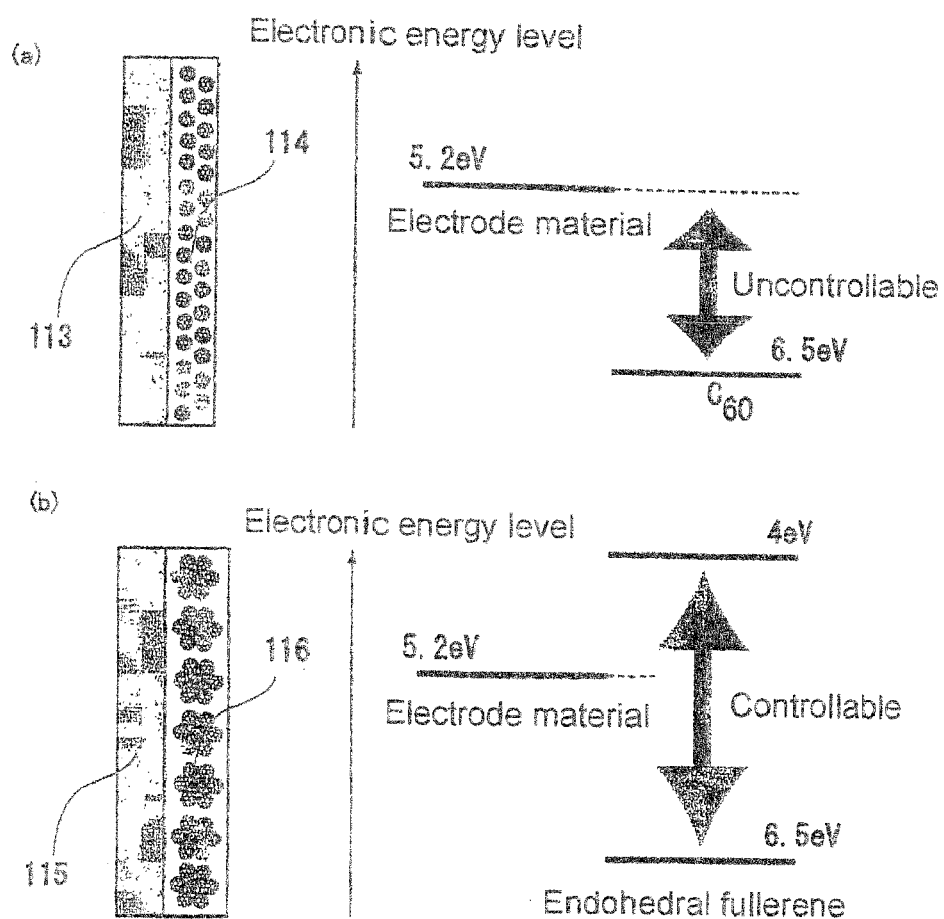
FIG. 14 is a view showing an electronic energy level of a film composed of the empty fullerenes (a) and an electronic energy level of a film composed of the endohedral fullerene clusters (b)

As the other practical application of the fullerene thin film of the present invention, by utilizing the electronic energy level inherent in the endohedral fullerene cluster, the fullerene thin film is used as the functional thin film in solar batteries, transistors, organic EL elements, light emitting diodes, optical sensors, molecular sensors and ion sensors, and is effective for improving the element property. FIG. 14(a) is the figure showing the electronic energy level of the fullerene thin film 114 obtained by depositing the conventional empty fullerene on the electrode 113. FIG. 14(b) is the figure showing the electronic energy level of the fullerene thin film 116 obtained by depositing the endohedral fullerene cluster on the electrode 115. For example, when aluminium is used for a cathode of the organic EL element and the empty fullerene shown in FIG. 13 is used for an electron injection layer, then the electronic energy level of aluminium is 5.2 eV and the electronic energy level of the empty fullerene $C_{60}$ is 6.5 eV. In this case, since the electronic energy levels are discrete, an electron injection efficiency is low and the organic EL element with high luminescence efficiency could not be produced. Meanwhile, when the endohedral fullerene cluster of the present invention is used for the electron injection layer, its electronic energy level can be controlled by controlling the type of the endohedral atom and the number of the empty fullerenes added to the endohedral fullerene. By selecting the appropriate endohedral fullerene cluster, it becomes possible to enhance the electron injection efficiency and produce the organic EL element with high luminescence efficiency. Because of being capable of controlling the energy level, it becomes possible to improve the property not only in the organic EL element but also by using for electronic devices such as solar batteries.

It is also possible to form the fullerene thin film by application, sputtering and ion plating in addition to the deposition.

(Fullerene-Dispersed Polymer Film)

The endohedral fullerene or the endohedral fullerene cluster not only is utilized as the thin film but also can be used by doping to the film composed of the other material. As the film composed of the other material, it is preferable to use conductive organic materials. By using as the functional film in photoelectric transfer elements such as solar batteries, organic EL elements, light emitting diodes and optical sensors, piezoelectric elements, and transistors, the elemental property is improved. As the conductive organic material, for example, aluminium complexes, oxadiazoles, triazoles, phenanthrolines, PBD, polyaniline, polyparaphenylene, polythiophene, and poly(3-methylthiophene) can be used.

Figure 15:
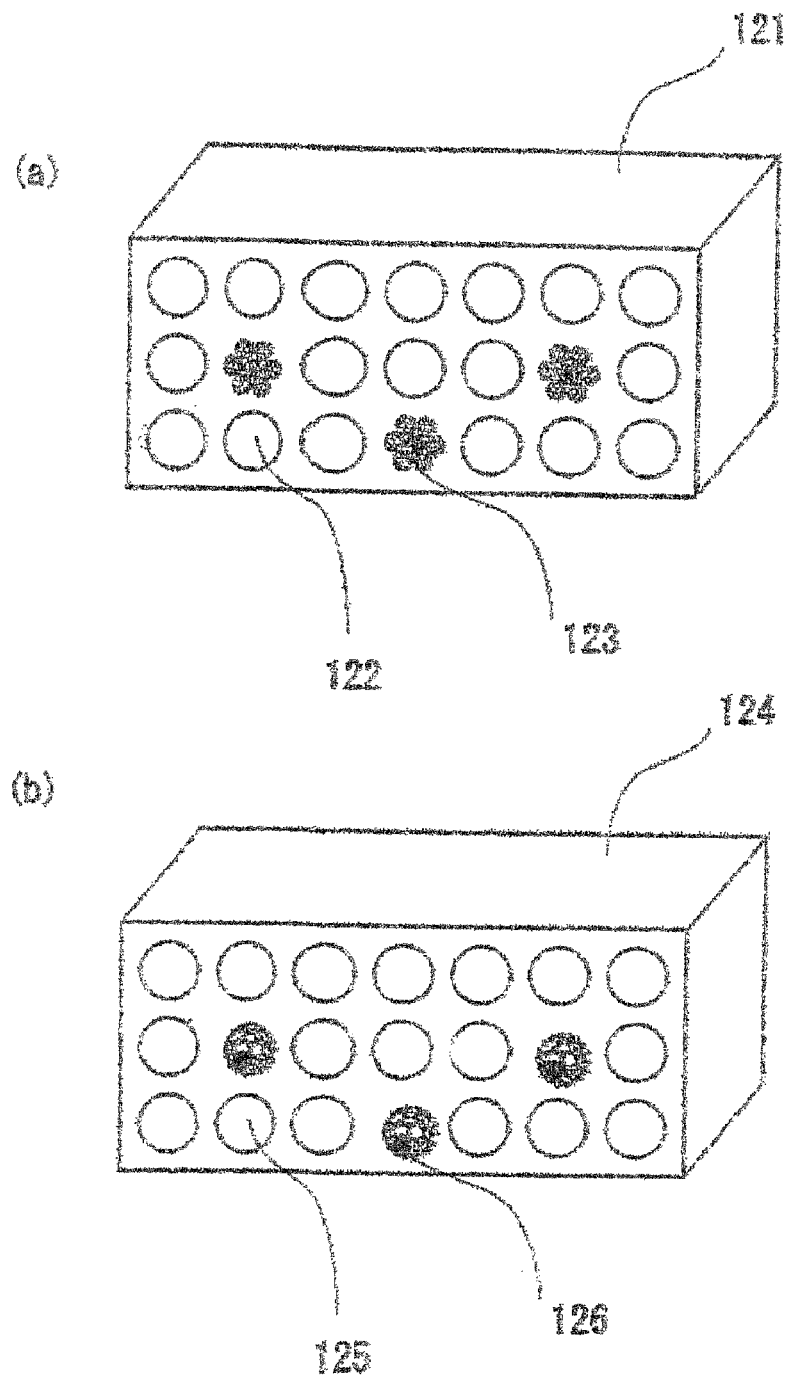
FIG. 15 is a perspective view (a) of a polymer film in which the endohedral fullerene clusters have been dispersed and a perspective view (b) of a polymer film in which the endohedral fullerenes have been dispersed.

The endohedral fullerene doped to the organic material is present relatively stably even when it is not surrounded with the empty fullerenes. FIG. 15(a) is the perspective view of the polymer film in which the endohedral fullerene clusters are dispersed. FIG. 15(b) is the perspective view of the polymer film in which the endohedral fullerenes are dispersed. Since its electronic energy level can be controlled by controlling the type of the endohedral atom and the number of the empty fullerenes added to the endohedral fullerene, the elemental property can be improved and controllability of the elemental property can be enhanced.

In the piezoelectric sensor using the conventional ceramics-dispersed polymer film, the dielectric constant is about 6, which is low, and if the dielectric constant is tried to increase, the crystallinity is collapsed. Meanwhile, the endohedral fullerene-dispersed polymer film has the dielectric constant of 30 to 60, which is high, and the high crystallinity, and can improve the property of the piezoelectric sensor. The endohedral fullerene-dispersed film can be applied to small sized capacitors with large capacity by taking advantage of its high dielectric constant.

(Fullerene Microstructure)

FIGS. 16(a) and (b) are the perspective views of the microstructures using the endohedral fullerene cluster and the endohedral fullerene, respectively. Grooves formed on the substrate shown in the figure are formed by microfabrication technology such as FIB and dry etching. A width of the representative groove is 0.5 nm to 100 nm. In FIG. 16(a), the endohedral fullerene clusters 132, 133 are disposed in the grooves 134, 135 on the substrate 134. In FIG. 16(b), the endohedral fullerenes 139, 140 are disposed in the grooves 137, 138 on the substrate 136.

For example, the nitrogen-encapsulating endohedral fullerene encapsulates the atom having a long spin lifetime. Thus, by forming the element of the structure shown in FIG.

16(b), it becomes possible to dispose the multiple endohedral fullerenes with equal intervals and uniform density, which can be practically applied to quantum computers utilizing the long lifetime spin.

EXAMPLES

The present invention will be described in detail below with reference to Examples but the present invention is not limited thereto.

Example 1

Synthesis of Li-Encapsulating Endohedral Fullerene

An apparatus having the structure where an electromagnetic coil had been disposed around a cylindrical stainless container and shown in FIG. 17 was used for producing the Li-encapsulating endohedral fullerene. Li supplied from Aldrich and unpurified for isotopes was used as Li, which was the material to be used. $C_{60}$ supplied from Frontier Carbon was used as $C_{60}$, which was the material to be used. A vacuum container 301 was degassed to a vacuum degree of $4.2 \times 10^{-5}$ Pa and a magnetic field at a magnetic field intensity of 0.2 T was generated by the electromagnetic coil 303. Solid Li was filled in an oven 304 for sublimating an endohedral atom, and Li was heated and sublimated at a temperature of 480° C. to generate an Li gas. The generated Li gas was introduced through a gas introduction tube 305 heated to 500° C., and emitted to a thermal ionization plate 306 heated to 2500° C. An Li vapor was ionized on the surface of the thermal ionization plate 306 to generate a plasma flow composed of Li positive ions and electrons. Furthermore, a $C_{60}$ vapor heated and sublimated at 610° C. in a chimney type fullerene oven was introduced into the generated plasma flow. A bias voltage of −30 V was applied to a cup-shaped deposition substrate 310 to be contacted with the plasma flow to deposit a thin film including endohedral fullerenes on the surface of the deposition substrate 310. The synthesis was performed three times. In the respective syntheses, a raw material supply ratio (Li ion/$C_{60}$) was changed to 0.6, 1.0 or 1.8. The thin film was deposited for about one hour, and the thin film having a thickness of 0.8 to 1.4 μm was deposited.

Example 2

Solvent Extraction Using Chloronaphthalene

Figure 19:
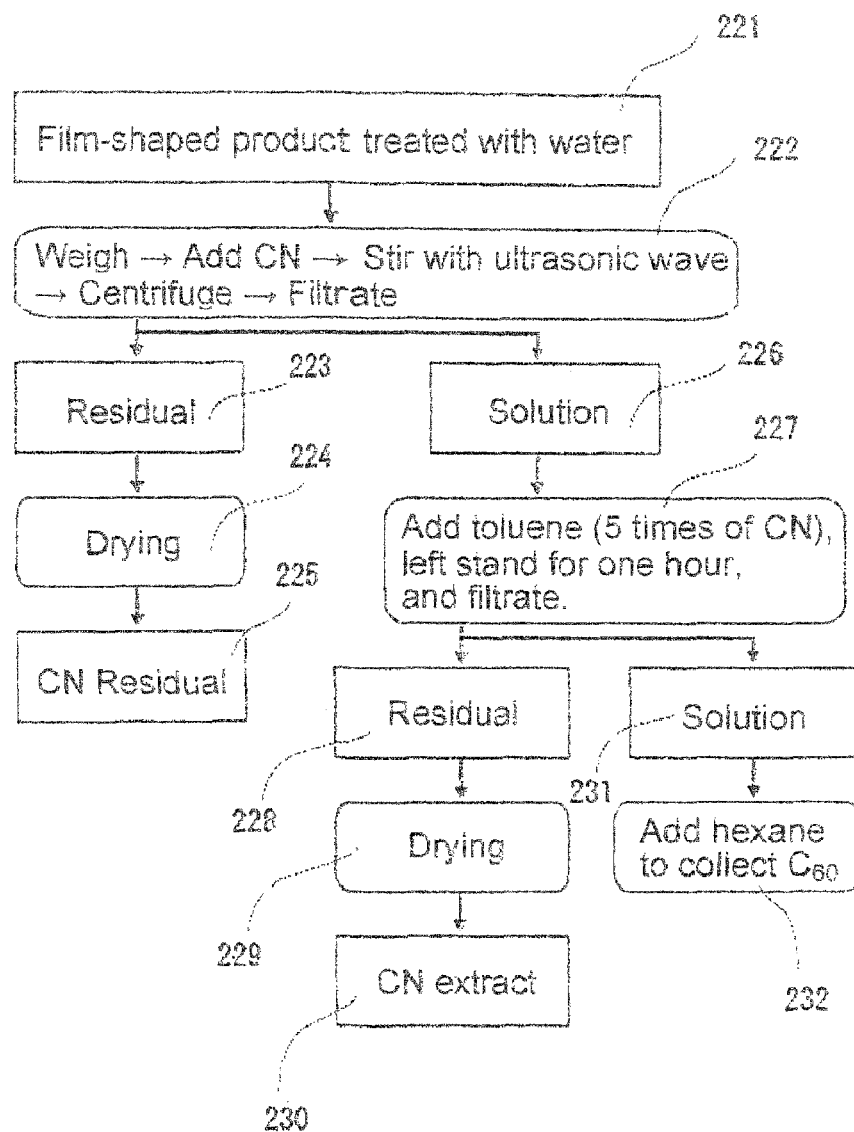
FIG. 19 is a flowchart of the method for extracting the endohedral fullerene with a solvent using chloronaphthalene.

FIG. 19 is a flowchart in Example of the solvent extraction of the endohedral fullerene using chloronaphthalene. The Li-encapsulating endohedral fullerene was synthesized by the plasma irradiation, and a film-shaped product 221 treated with water was prepared. The film-shaped product included the endohedral fullerene clusters and the empty fullerenes, but unreacted Li was removed. First, the film-shaped product 221 was weighed. In Example, about 1.5 g of the film-shaped product was used. A chloronaphthalene solution (30 mL) was added to the weighed film-shaped product, the mixture was stirred with ultrasonic wave, centrifuged and filtrated with a membrane filter (step 222). The residual, which had been insoluble in the solution, and the residual left on the filter were dried (step 224) and stored. A filtrated chloronaphthalene solution 226 was mixed with toluene whose amount was 5 times of the solution 226, and the mixture was left stand for one hour and filtrated (step 227). The residual insoluble in toluene and the residual left on the filter were mixed and dried (step 229), and used as the endohedral fullerene extracted with the solvent (230). Since lots of the empty fullerenes were included in the toluene solution 231, the poor solvent such as hexane for the empty fullerene was added to precipitate the empty fullerenes, which were collected and reused.

FIG. 20 is the table showing the data of the ratio of the endohedral fullerene, an extraction ratio and a recovery ratio of the endohedral fullerene obtained after performing 8 times the isolation and purification of the Li-encapsulating endohedral fullerene by extraction with chloronaphthalene. The ratio of the endohedral fullerene described previously was 6.0% in average. Meanwhile the extraction ratio is defined as the ratio of the purified product to the synthesized product before the isolation and purification. Upon evaluating the method for the isolation and purification, not only the purity (ratio of the endohedral fullerene in the case of the endohedral fullerene) indicating how purity can be achieved from the material but also the extraction ratio indicating how much purified product can be obtained are important properties. In Example, the extraction ratio was about 5.5% in average. The recovery ratio of the endohedral fullerene is a product of the ratio of the endohedral fullerene and the extraction ratio, and was about 0.3% in average.

Example 3

Solvent Extraction Using Tetralin

Figure 21:
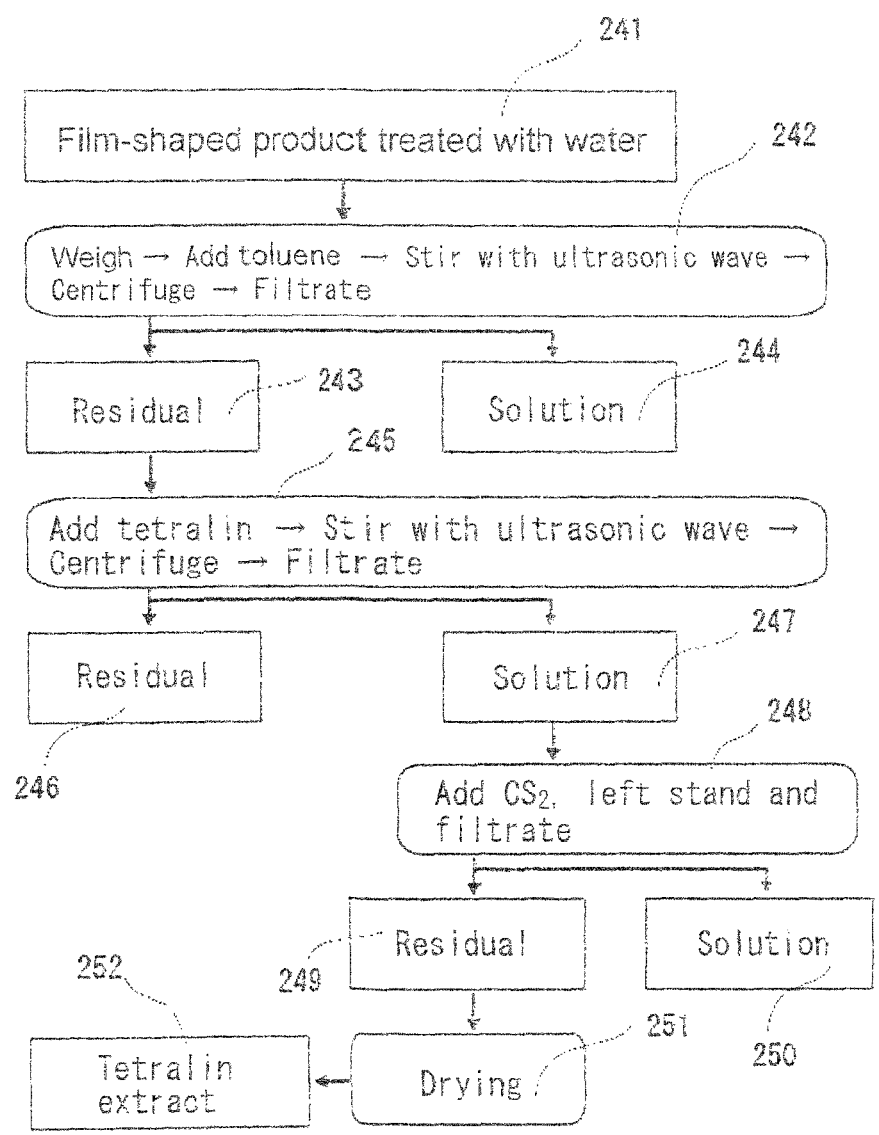
FIG. 21 is a flowchart of the method for extracting the endohedral fullerene with a solvent using tetralin.

FIG. 21 is a flowchart in Example of the solvent extraction of the endohedral fullerene using tetralin. The Li-encapsulating endohedral fullerene was synthesized by the plasma irradiation, and a film-shaped product 241 treated with water was prepared. The film-shaped product included the endohedral fullerene clusters and the empty fullerenes, but unreacted Li was removed. First, the film-shaped product 241 was weighed. In Example, about 1.0 g of the film-shaped product was used. Toluene was added to the weighed film-shaped product, and the mixture was stirred with the ultrasonic wave, centrifuged and filtrated with the membrane filter (step 242: solvent washing). Subsequently, the residual which had been insoluble in the solution and the residual left on the filter were dried, 300 mL of tetralin was added thereto, and the mixture was stirred with the ultrasonic wave, centrifuged and filtrated with the membrane filter (step 245: solvent extraction). $CS_2$ was added to a filtrated tetralin solution 247, the mixture was left stand for one hour and filtrated with the membrane filter (step 248: reprecipitation). The residual insoluble in $CS_2$ and the residual left on the filter were dried (step 251) to use as the endohedral fullerene extracted with the solvent (252).

Example 4

NMR Measurement of Li@$C_{60}$

Figure 22:
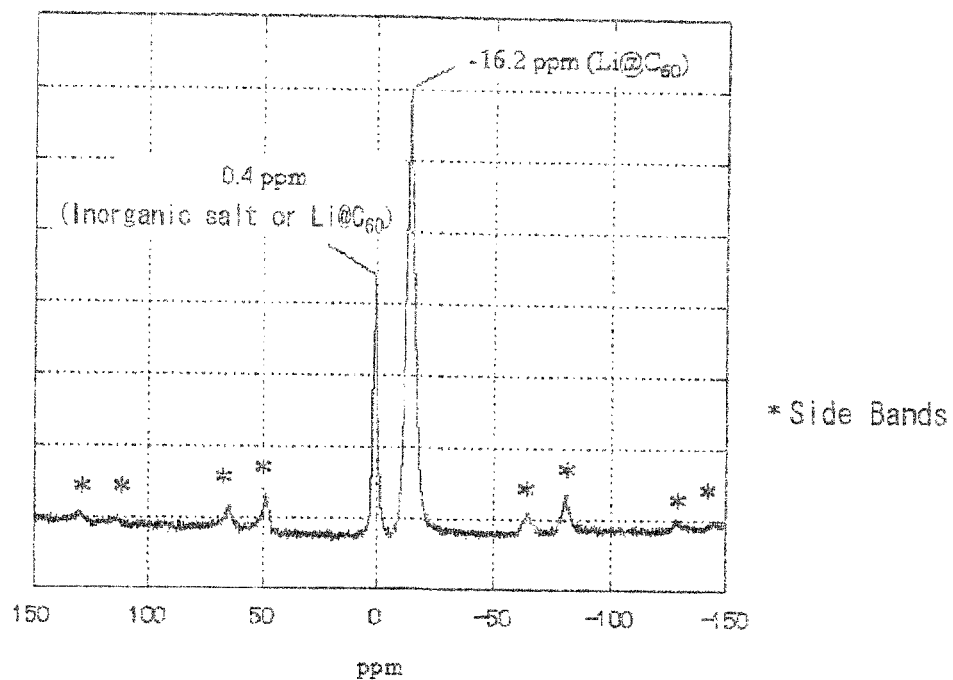
FIG. 22 is a view showing $^7$Li NMR spectrum of purified Li@$C_{60}$ by solid MAS measurement.
Figure 23:
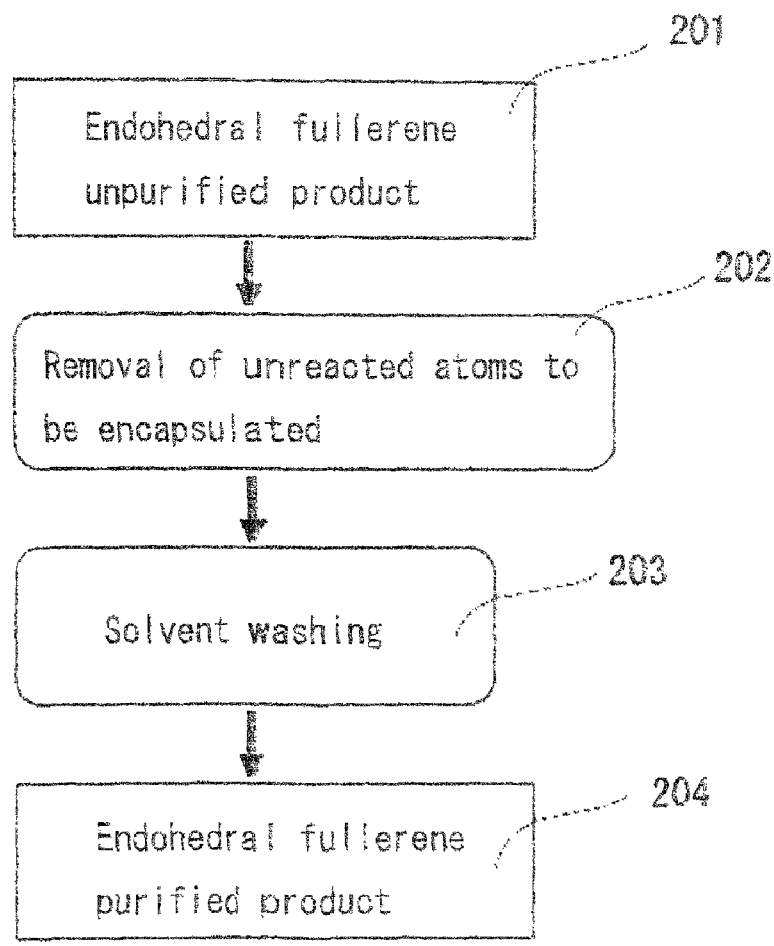
FIG. 23 is a process flowchart of a conventional method for isolating and purifying the endohedral fullerene.

FIG. 22 shows an $^7$Li NMR spectrum of Li@$C_{60}$ purified product by solid MAS measurement. In addition to the peak at 0.4 ppm attributed to an inorganic salt or exohedral Li$C_{60}$, the peak at −16.2 ppm was observed as the main peak. An $^7$Li NMR chemical shift value of a compound which is a standard sample of Li@$C_{60}$ is not reported, but the chemical shift value of [Li@$C_{60}$] obtained by scientific calculation is reported in Nonpatent Literature 3. According to this, it is calculated that endohedral Li nucleus when the Li ion is encapsulated inside a $C_{60}$ shell gives a signal at −14.5 ppm. A peak range given by an Li ion nucleus in $^7$Li NMR is generally narrow, and is shifted to only about 10 ppm around 0 ppm. The Li nucleus having such a nature gives the peak at −16.2 ppm, which is in the high magnetic field, indicating that the Li nucleus receives a very large magnetic shield. This indicates a strong shielding effect of the $C_{60}$ shell.

INDUSTRIAL APPLICABILITY

As in the above, the fullerene-based material and the method for producing the fullerene-based material according to the present invention enable to purify the endohedral fullerene with high purity which is the novel material and to enhance the yield, and in particular are useful in the fields of electronics and medical care.

The invention claimed is:

1. A fullerene-based material, comprising:
   12 to 55 empty fullerene molecules having no endohedral atom, said molecules surrounding and bound to,
   one alkali metal-encapsulating endohedral fullerene which encapsulates the alkali metal therein,
   wherein the material is synthesized by plasma irradiation.

2. The fullerene-based material according to claim 1, wherein said alkali metal is Li, Na, K, Rb, Cs or Fr, and said fullerene molecule is represented by a chemical formula $C_n$ and n=60 to 82.

3. The fullerene-based material according to claim 1, wherein said alkali metal is Li, and said fullerene molecule is $C_{60}$.

4. The fullerene-based material according to claim 1, wherein the 12 to 55 empty fullerene molecules surrounding and bound to the one alkali metal-encapsulating endohedral fullerene are arranged in a single layer.

5. The fullerene-based material according to claim 1, wherein the 12 to 55 empty fullerene molecules surrounding and bound to the one alkali metal-encapsulating endohedral fullerene are arranged in two layers.

* * * * *

UNITED STATES PATENT AND TRADEMARK OFFICE
CERTIFICATE OF CORRECTION

PATENT NO. : 8,367,033 B2  Page 1 of 1
APPLICATION NO. : 12/297728
DATED : February 5, 2013
INVENTOR(S) : Okada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this
First Day of September, 2015

Michelle K. Lee
*Director of the United States Patent and Trademark Office*